(12) United States Patent
Xu et al.

(10) Patent No.: US 11,662,531 B2
(45) Date of Patent: May 30, 2023

(54) FERRULE HOLDER ASSEMBLY

(71) Applicant: Senko Advanced Components, Inc., Marlborough, MA (US)

(72) Inventors: Gang Xu, Shenzhen (CN); Takuya Nimomiya, Natick, MA (US)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/329,705

(22) Filed: May 25, 2021

(65) Prior Publication Data
US 2021/0373255 A1 Dec. 2, 2021

Related U.S. Application Data

(60) Provisional application No. 63/031,697, filed on May 29, 2020.

(51) Int. Cl.
*G02B 6/40* (2006.01)
*G02B 6/38* (2006.01)
*G02B 6/42* (2006.01)

(52) U.S. Cl.
CPC .............. *G02B 6/406* (2013.01); *G02B 6/381* (2013.01); *G02B 6/3807* (2013.01); *G02B 6/3825* (2013.01); *G02B 6/428* (2013.01)

(58) Field of Classification Search
CPC .... G02B 6/3807; G02B 6/381; G02B 6/3825; G02B 6/3898; G02B 6/406; G02B 6/424; G02B 6/428
See application file for complete search history.

(56) References Cited

U.S. PATENT DOCUMENTS

| | | | | |
|---|---|---|---|---|
| 6,302,596 B1* | 10/2001 | Cohen | ................. | G02B 6/4204 385/88 |
| 6,364,534 B1* | 4/2002 | Lampert | .............. | G02B 6/3897 385/59 |
| 6,412,986 B1* | 7/2002 | Ngo | ..................... | G02B 6/3897 385/59 |
| 8,920,043 B2* | 12/2014 | Iwaya | .................. | G02B 6/3879 385/139 |
| 9,116,324 B2* | 8/2015 | Cooke | .................. | G02B 6/4452 |
| 10,677,999 B2* | 6/2020 | Leigh | ................... | G02B 6/3825 |
| 2020/0018909 A1 | 1/2020 | Chang | | |
| 2021/0026083 A1* | 1/2021 | Iizumi | .................. | G02B 6/3885 |

* cited by examiner

*Primary Examiner* — Daniel Petkovsek

(57) ABSTRACT

A ferrule holder assembly can support groupings of a transceiver ferrules in an optical connector interface of an optical transceiver. A first holder body holds a first grouping of transceiver ferrules and has a holder-to-holder interface. A second, typically identical, holder body holds a second grouping of transceiver ferrules. The holder-to-holder interface of the first holder body engages the holder-to-holder interface of the second holder body to operatively align the first holder body with the second holder body to position the first grouping of transceiver ferrules and the second grouping of transceiver ferrules in the optical connector interface for making optical connections to one or more optical connectors plugged into the optical connector interface. The ferrule holder assembly can be used in combination with pre-terminated fiber arrays to couple an optical interface to a circuit board in a transceiver.

26 Claims, 24 Drawing Sheets

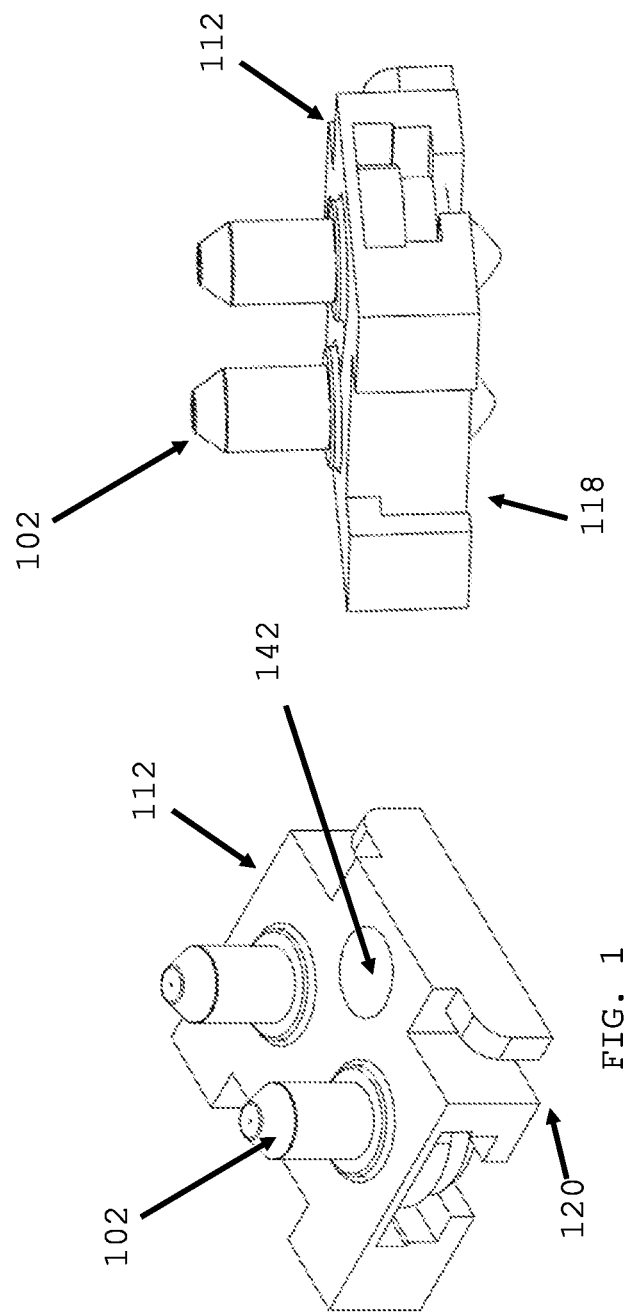

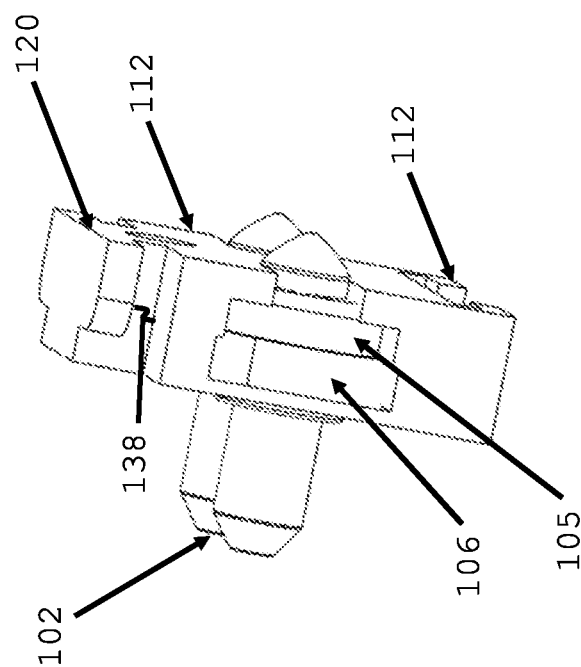
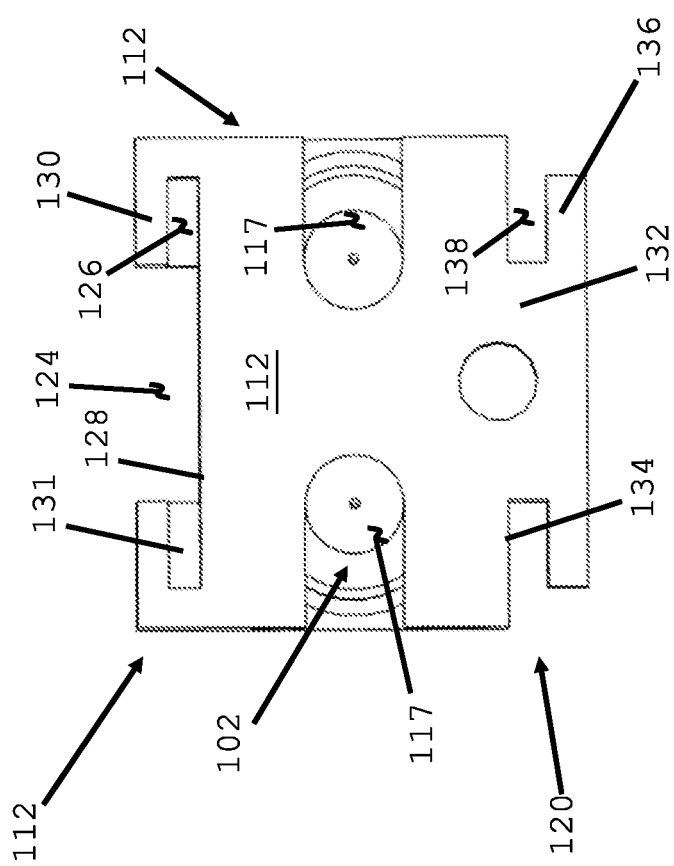

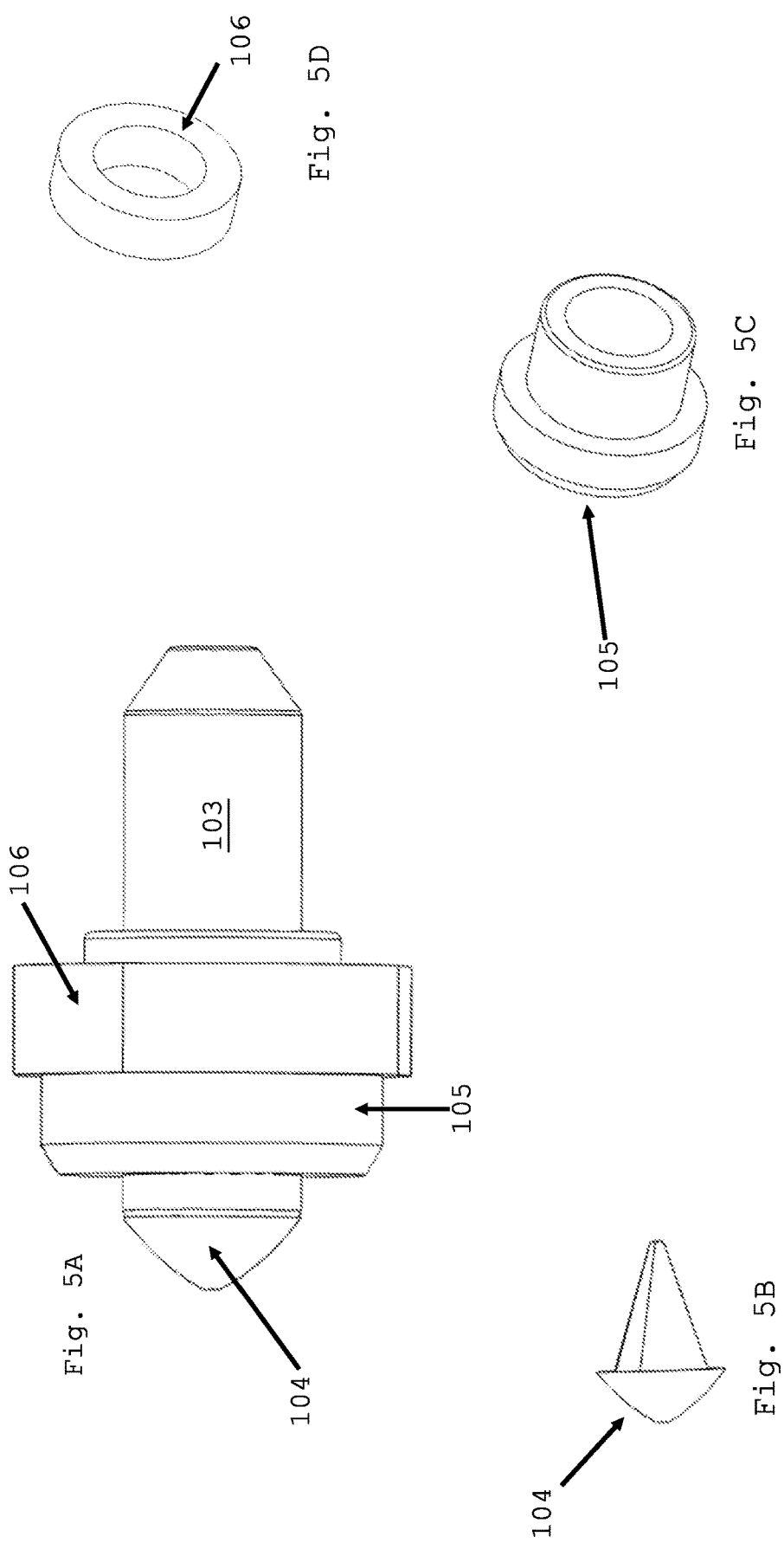

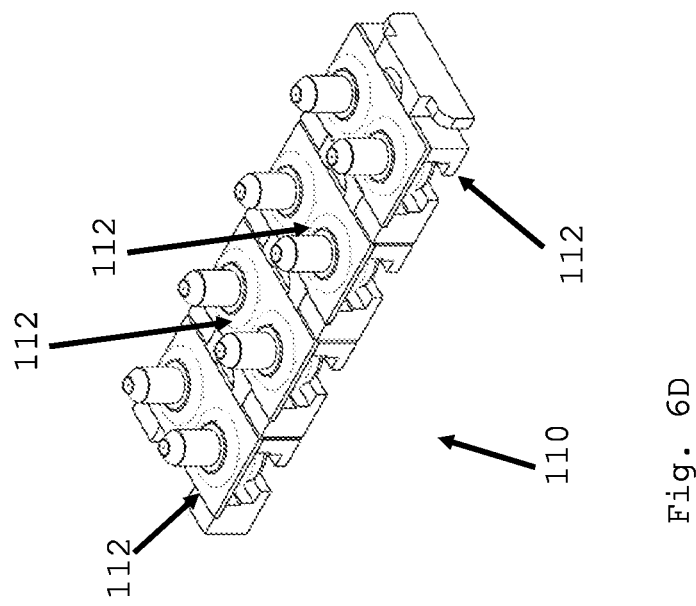
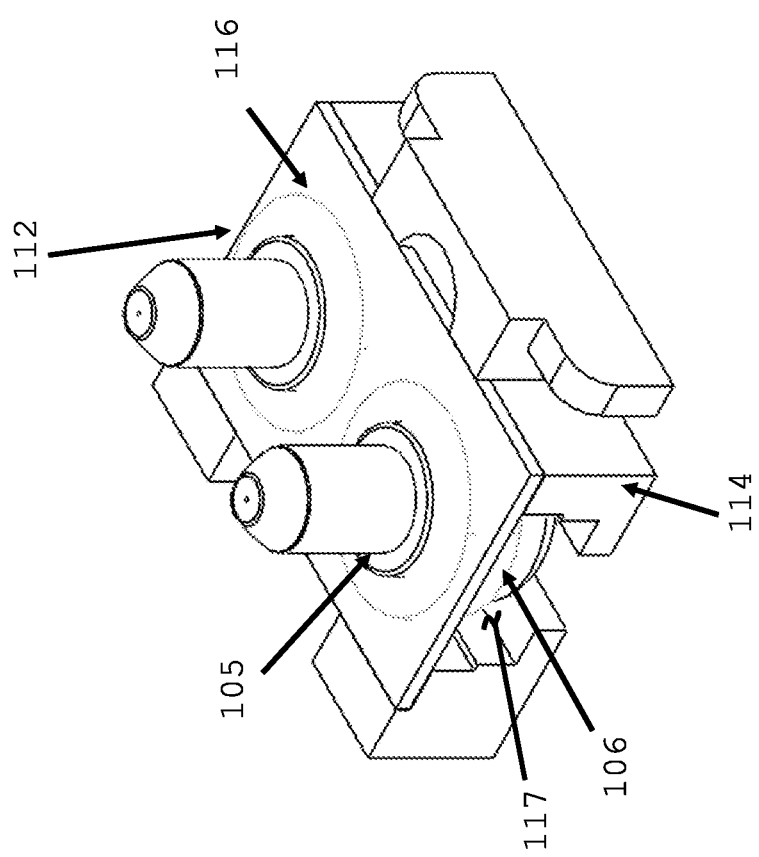

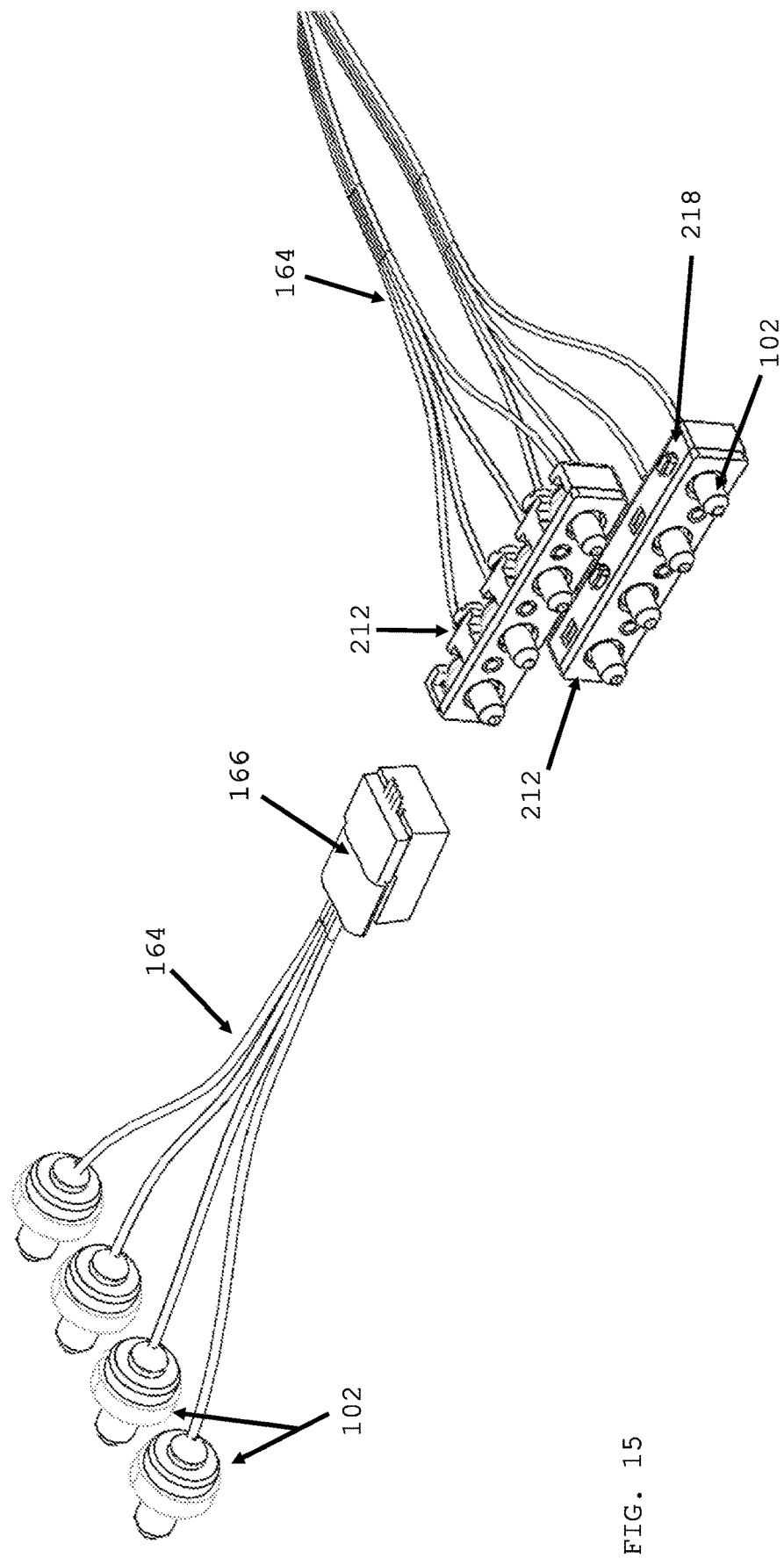

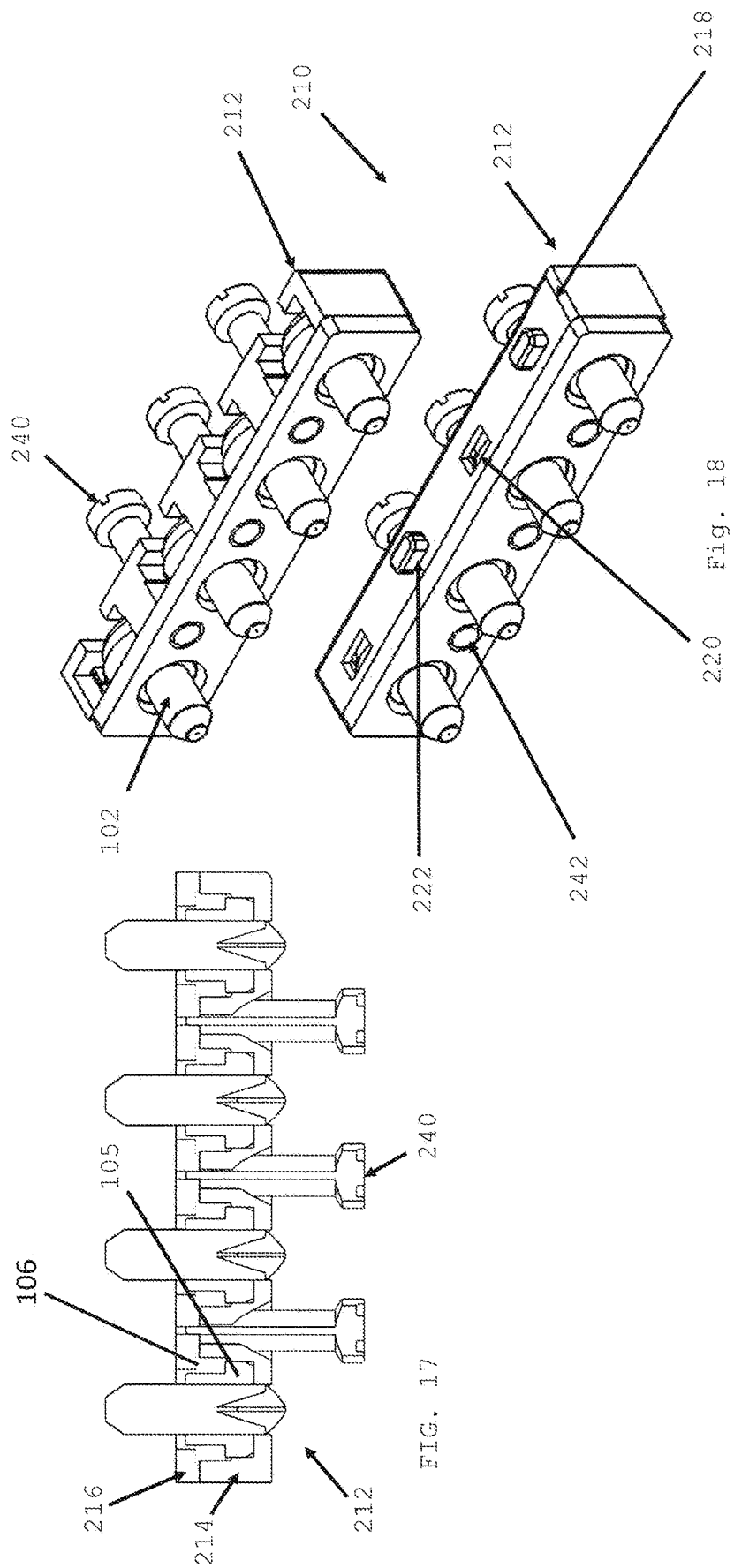

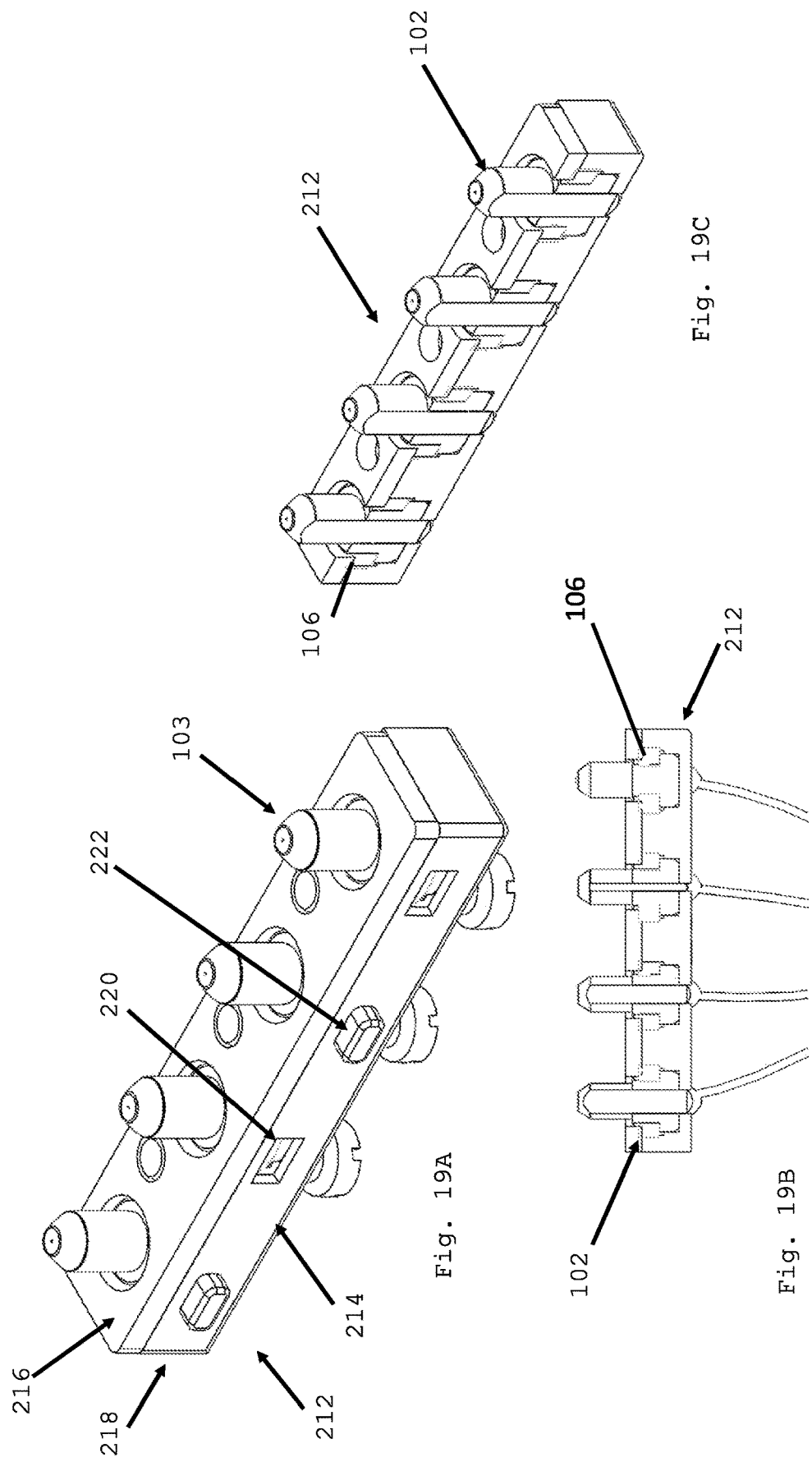

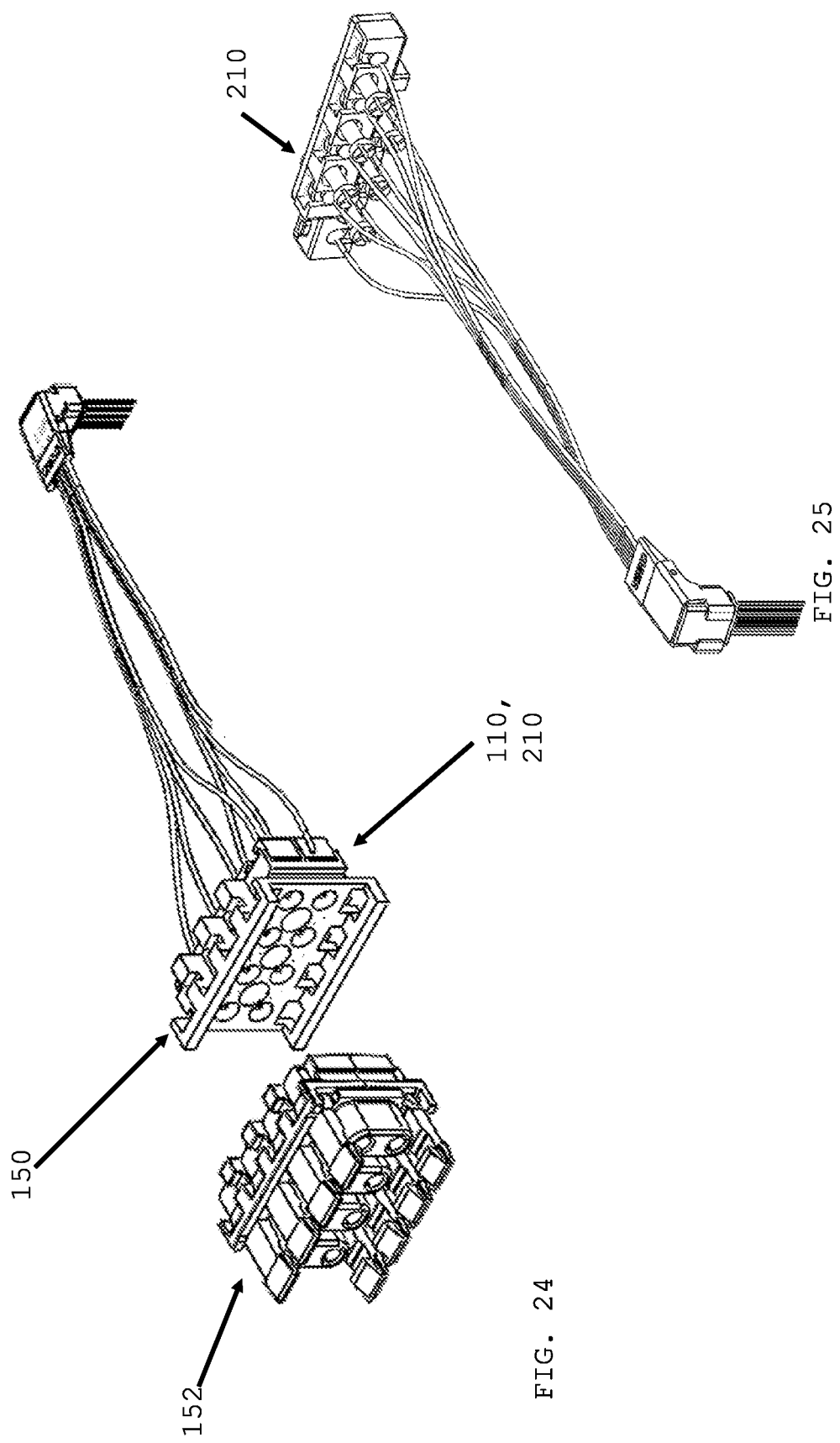

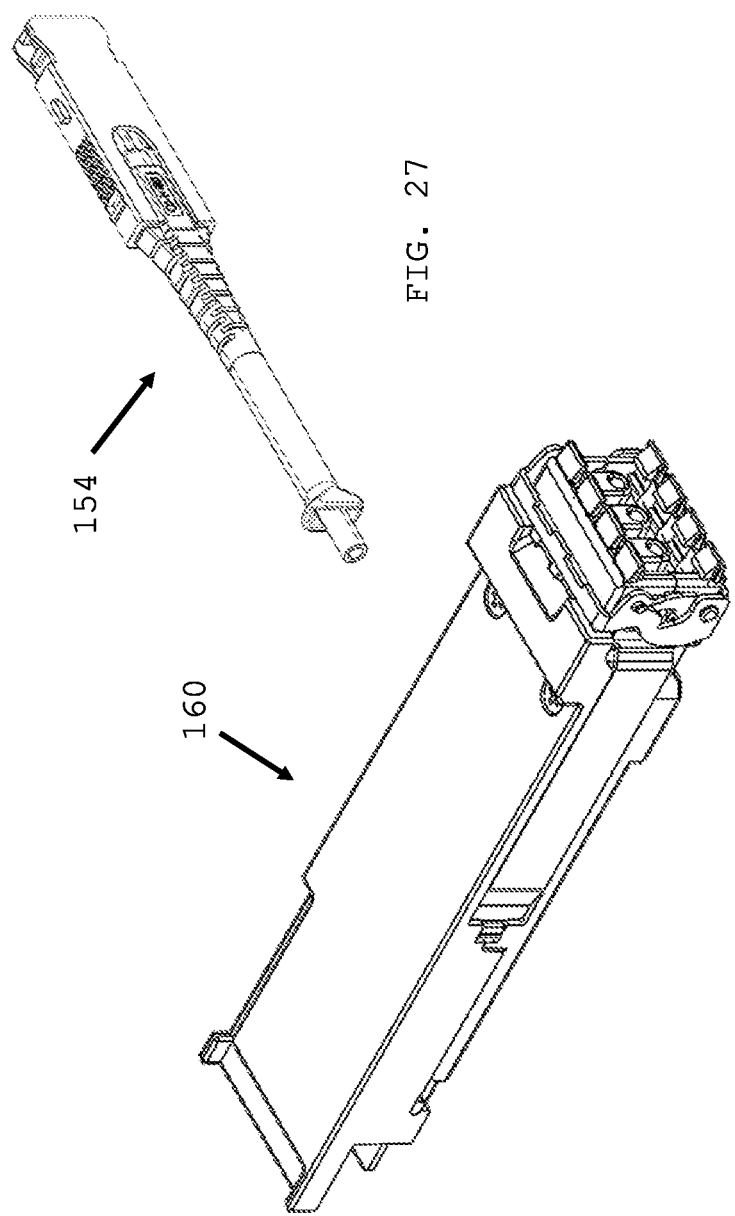

FERRULE HOLDER ASSEMBLY

CROSS-REFERENCE TO RELATED APPLICATION

This application claims priority to U.S. Provisional Patent Application No. 63/031,697, filed May 29, 2020, which is hereby incorporated by reference in its entirety for all purposes.

FIELD

The present disclosure generally relates to components used in an optical connector interface of a transceiver.

BACKGROUND

The prevalence of the Internet has led to unprecedented growth in communication networks. Consumer demand for service and increased competition has caused network providers to continuously find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead. However, room for improvement in the area of data centers, specifically as it relates to fiber optic connections, still exists. For example, manufacturers of connectors and adapters are always looking to reduce the size of the devices, while increasing ease of deployment, robustness, and modifiability after deployment. In particular, more optical connectors may need to be accommodated in the same footprint previously used for a smaller number of connectors in order to provide backward compatibility with existing data center equipment. For example, one current footprint is known as the small form-factor pluggable transceiver footprint (SFP). This footprint currently accommodates two LC-type ferrule optical connections. However, it may be desirable to accommodate four optical connections (two duplex connections of transmit/receive) within the same footprint. Another current footprint is the quad small form-factor pluggable (QSFP) transceiver footprint. This footprint currently accommodates four LC-type ferrule optical connections. However, it may be desirable to accommodate eight optical connections of LC-type ferrules (four duplex connections of transmit/receive) within the same footprint.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. While both approaches may be effective to increase the panel connector density, shrinking the connector size and/or spacing may also increase the support cost and diminish the quality of service.

In a high-density panel configuration, adjacent connectors and cable assemblies may obstruct access to the individual release mechanisms. Such physical obstructions may impede the ability of an operator to minimize the stresses applied to the cables and the connectors. For example, these stresses may be applied when the user reaches into a dense group of connectors and pushes aside surrounding optical fibers and connectors to access an individual connector release mechanism with his/her thumb and forefinger. Overstressing the cables and connectors may produce latent defects, compromise the integrity and/or reliability of the terminations, and potentially cause serious disruptions to network performance.

While an operator may attempt to use a tool, such as a screwdriver, to reach into a dense group of connectors and activate a release mechanism, adjacent cables and connectors may obstruct the operator's line of sight, making it difficult to guide the tool to the release mechanism without pushing aside the adjacent cables. Moreover, even when the operator has a clear line of sight, guiding the tool to the release mechanism may be a time-consuming process. Thus, using a tool may net be effective at reducing support time and increasing the quality of service.

SUMMARY

In one aspect, a grouped ferrule holder assembly is configured to support a plurality of transceiver ferrules in an optical connector interface of an optical transceiver. The grouped ferrule holder assembly comprises a first holder body configured to hold a first grouping of transceiver ferrules. The first holder body comprises a holder-to-holder interface. A second holder body is configured to hold a second grouping of transceiver ferrules. The second holder body comprises a holder-to-holder interface. The holder-to-holder interface of the first holder body is configured to engage the holder-to-holder interface of the second holder body to operatively align the first holder body with the second holder body to position the first grouping of transceiver ferrules and the second grouping of transceiver ferrules in the optical connector interface for making optical connections to one or more optical connectors plugged into the optical connector interface.

In another aspect, the disclosure also provides a transceiver comprising an optical interface including the grouped ferrule holder assembly.

In another aspect, a method of making a transceiver comprises assembling the grouped holder assembly, securing the grouped holder assembly in an optical connector interface of a transceiver, and connecting optical fibers between a plurality of ferrules held by the grouped ferrule holder assembly and one or more board-mounted connectors on a circuit board of the transceiver.

In another aspect, a pre-terminated fiber array assembly comprises a pre-terminated fiber array. The pre-terminated fiber array comprises a plurality of transceiver ferrules and a plurality of optical fibers. Each of the plurality of optical fibers has a first end portion terminated by one of the plurality of transceiver ferrules and an opposite second end portion. A multi-fiber connector terminates the second end portions of the plurality of optical fibers. The multi-fiber connector is configured to couple to a board-mounted connector on a circuit board of a transceiver. At least one holder body holds the plurality of transceiver ferrules. Each holder body comprises a holder-to-holder interface configured to couple the holder body to another identical holder body to form a grouped ferrule holder assembly.

In another aspect, a method of making a transceiver comprises connecting the at least one holder body of a pre-terminated fiber array assembly to another holder body to form a grouped ferrule holder assembly. The grouped ferrule holder assembly is secured in an optical connector interface of the transceiver, and a multi-fiber connector of the pre-terminated fiber array is connected to a board-mounted connector on a circuit board of the transceiver.

Other aspects will be in part apparent and in part pointed out hereinafter.

BRIEF DESCRIPTION OF THE DRAWINGS

FIG. 1 is a perspective of a two-ferrule holder;
FIG. 2 is another perspective of the two-ferrule holder;
FIG. 3 is a plan view of the two-ferrule holder;
FIG. 4 is another perspective of the two-ferrule holder;
FIG. 5A is an elevation of a transceiver ferrule;
FIG. 5B is an elevation of a pin of the transceiver ferrule;
FIG. 5C is a perspective of an alignment sleeve of the transceiver ferrule;
FIG. 5D is a perspective of a resiliently compressible ring of the transceiver ferrule;
FIG. 6C is another perspective of the two-ferrule holder;
FIG. 6D is a perspective of the grouped ferrule holder assembly after being assembled;
FIG. 15 is a perspective of a pre-terminated fiber assembly including four ferrules, four fibers, and a multi-fiber connector;
FIG. 16 is an enlarged view of the portion of FIG. 14;
FIG. 17 is a cross section through a four-ferrule holder;
FIG. 18 is a perspective of the grouped ferrule holder assembly comprising two four-ferrule holders;
FIG. 19A is a perspective of the four-ferrule holder;

FIG. 19B is a cross section of the four-ferrule holder;
FIG. 19C is a cross-sectional perspective of the four-ferrule holder;
FIG. 24 is an exploded perspective showing how the assembly of FIG. 23 attaches to adapter latch hooks;
FIG. 25 is another perspective of the assembly of FIG. 21;
FIG. 27 is a perspective of a connector;
FIG. 28 is a perspective of a transceiver.

Corresponding parts are given corresponding reference characters throughout the drawings.

DETAILED DESCRIPTION

Figure 6B:
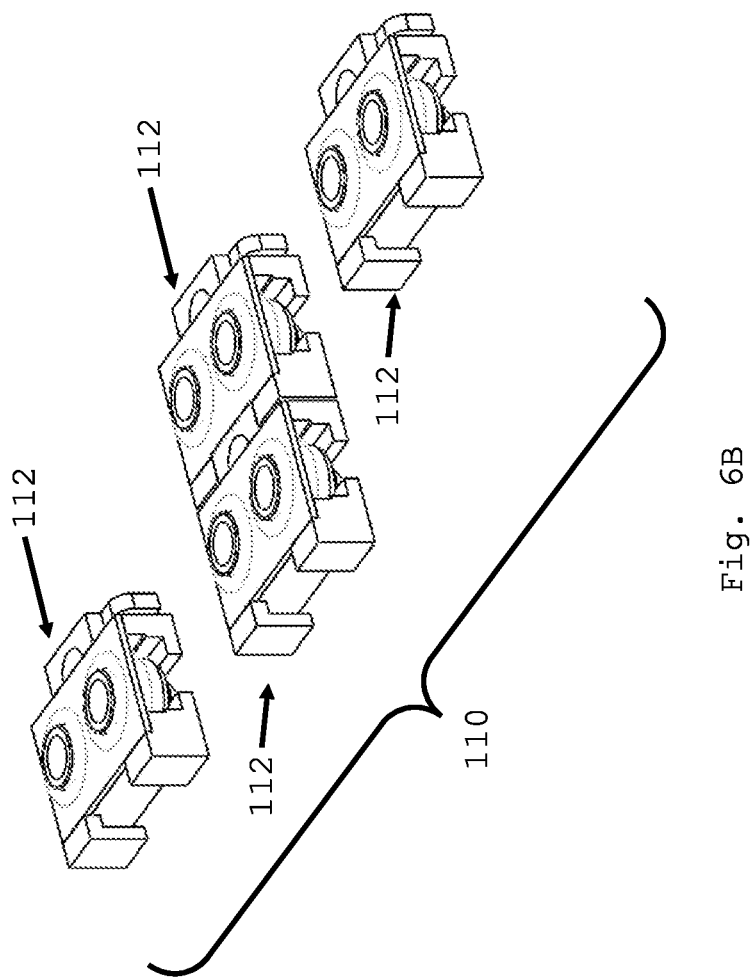
FIG. 6B is another disassembled perspective of the grouped ferrule holder assembly.
Figure 6A:
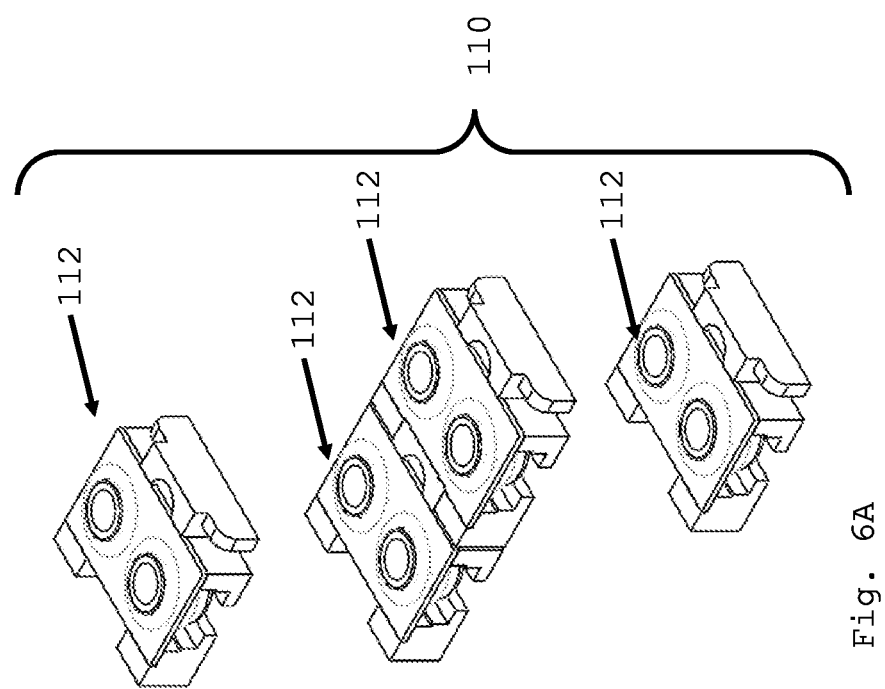
FIG. 6A is a disassembled perspective of a grouped ferrule holder assembly made up of four identical two-ferrule holders.

This disclosure generally pertains to optical transceiver interface components. Optical transceivers are well-known to those skilled in the art. In general, an optical transceiver comprises a circuit board with one or more optical components operatively connected to the circuit board. Conventionally, these optical components include transmitters configured to output optical signals (e.g., laser components) and receivers configured to detect optical signals.

One common type of transceiver is a pluggable transceiver module. These modules comprise a daughterboard with an electronic interface at one end and an optical interface at the opposite end. The electronic interface end portion of a pluggable transceiver module can be plugged into computing equipment such as a server rack to make an electrical connection between the daughterboard and a motherboard. Typically the optical interface at the opposite end includes an adapter that allows one or more standard optical connectors to be plugged into the transceiver, making an optical connection.

The inventors have recognized that modern advances in optical connectors have created an opportunity to improve certain aspects of the optical connector interface on an optical transceiver such as a pluggable transceiver module. In particular, the form factor of optical connectors has substantially decreased in recent years, leading to improvements in signal path density.

As explained above, modern advances in optical connector technology have created opportunities for at least twice as many optical signal paths to be connected in the same adapter footprint. For instance, the relatively new CS® connector enables an optical interface of a QFSP transceiver to mate with two CS® connectors, each containing duplex LC ferrules. Furthermore, SN™ and MDC connectors allow greater density still. QSFP transceivers with an SN™ or MDC optical interface can connect to four duplex connectors, each with a pair of first and second LC optical fiber ferrules.

This substantial increase in signal path density has the potential to enhance the capability of transceivers. But the inventors have recognized that, with the enhanced capability, comes increased transceiver complexity, particularly increased complexity in creating more than twice as many internal signal paths between daughterboard and optical interface.

FIG. 30 depicts a transceiver 10 with an optical interface 12 configured to mate with four SN™ connectors 14. In FIG. 30 the housing of the transceiver 10 has been removed to reveal internal components. The transceiver 10 comprises a circuit board 16 and one or more board-mounted connectors 18 disposed on the circuit board in operative communication with one or more active optical components such as a transmitter and/or receiver. A fiber array 20 extends between the optical interface 12 and the board-mounted connector 18. The fiber array 20 comprises a plurality of loose or bundled optical fibers, each with a first end connected to a ferrule (not shown) in the optical interface 12 and a second end terminated by one or more connectors 22 that couple to the board-mounted connector(s) 18. As can be seen, due to the high density of optical fibers in the optical interface 12, the fiber array 20 can become complicated, particularly when more than one board-mounted connector is used to connect the array to the board 16.

High density optical interfaces allow transceiver circuit boards to be constructed with varied configurations of board-mounted connectors. So for instance, a modern circuit board for an eight-ferrule optical interface might include one, two, or four board-mounted connectors. For a circuit board with two board-mounted connectors, a first board-mounted connector might be configured to connect four fibers in a fiber array to four transmitters and the second board mounted connector might be configured to connect the other four fibers in the fiber array to four receivers. In a board with four board-mounted connectors, each board-mounted connector might be configured to connect one transmitter and one receiver to a pair of optical fibers in the optical fiber array.

As explained more fully below, the inventors have devised ways to simplify the assembly process for transceivers by providing grouped ferrule holder assemblies that operatively hold groups of two or more transceiver ferrules within an optical interface of a transceiver. As will become apparent, the disclosure generally pertains to grouped ferrule holder assemblies made up of two or more ferrule holder bodies that can be connected together and secured to an optical interface of a transceiver to operatively position at least four transceiver ferrules within the optical interface for making optical connections to optical connectors that are later plugged into the optical interface of the transceiver.

In the following disclosure, two exemplary embodiments of grouped ferrule holder assemblies are discussed. The first comprises two or more ferrule holder bodies that are each configured to hold two ferrules (broadly, each holder body is configured to hold a grouping of ferrules). The second embodiment of a grouped ferrule holder assembly discussed below comprises two or more ferrule holder bodies that are each configured to hold four transceiver ferrules. Although two particular embodiments are described below, it will be understood that other configurations of grouped ferrule holder assemblies made up of two or more multi-ferrule holder bodies that can be connected together and operatively secured to an optical interface of a transceiver may also be used without departing from the scope of the disclosure.

Referring to FIGS. 1-10, an exemplary embodiment of a grouped ferrule holder assembly configured to support a plurality of transceiver ferrules 102 in an optical connector interface of an optical transceiver is generally indicated at reference number 110. The grouped ferrule holder assembly 110 comprises at least two holder bodies (e.g., first and second holder bodies) 112, and commonly four holder bodies, that can be connected together to position the ferrules 102 as required for a given optical connector interface of a transceiver. In the drawings, each holder body 112 is configured to hold a respective grouping of two transceiver ferrules 102. More particularly, each body 112 holds first and second transceiver ferrules 102 at a pitch of 3.1 mm (FIG. 10), corresponding to the ferrule pitch in an SN™ connector. When a first holder body 112 is operatively connected to a second holder body, the first grouping of ferrules in the first holder are spaced apart from the first grouping of ferrules in the second holder at a pitch of about 3.9 mm, corresponding to the standard lateral pitch between the ferrules of adjacent SN™ connectors mated to an SN™ adapter.

Certain exemplary components of an SN™ optical interface for a transceiver are described in greater detail in U.S. Patent Application Publication No. 2020/0018909, which is hereby incorporated by reference in its entirety for all purposes. Although the illustrated ferrule holder assembly 110 is used in an SN™ connector interface, it will be understood that the ferrule holder assembly could be adapted for use with other types of connector interfaces, such as other duplex connector interface formats including optical connector interfaces for duplex LC connectors, CS® connectors, and MDC connectors, among others.

Within the illustrated assembled ferrule holder assembly 110, each holder body 112 is configured to hold a respective grouping of two transceiver ferrules 102 for making a connection to the first and second connector ferrules of an individual connector. It will be appreciated, that first and second ferrule holder bodies 112 can be connected to form an optical interface for two connectors; first, second, and third ferrule holder bodies can be connected to form an optical interface for three connectors; first, second, third, and fourth ferrule holder bodies can be connected to form an optical interface for four connectors, etc. Accordingly, once assembled, the illustrated grouped ferrule holder assembly 110 is configured to hold n transceiver ferrules 102 in a (n/2)-connector optical interface.

Referring to FIGS. 5A-5D, in an exemplary embodiment, each transceiver ferrule 102 is a relatively short cylindrical ferrule comprising a ceramic ferrule pin portion 103. In FIG. 5A, the tip of the transceiver ferrule 102 that faces the connectors that plug into an optical interface is pointed to the right. The ferrule 102 comprises a pin 104 on the opposite end, which may provide strain relief. An alignment sleeve 105 is disposed over the ferrule body 103, and a resiliently compressible O-ring 106 is disposed around the alignment sleeve. The alignment sleeve 105 defines a shoulder that faces toward the tip of the ferrule 102. The O-ring 106 is seated against this shoulder.

Referring to FIG. 6C, in the illustrated embodiment, each holder body 112 comprises a holder body block 114 and a face plate 116 secured to the holder body block. Each holder body block 114 defines two receptacles 117, each configured for receiving a flange portion of a transceiver ferrule in the grouping of ferrules held by the holder body 112. In the illustrated embodiment, the 'flange portion' of the transceiver ferrule includes at least a portion of the alignment sleeve 105 and the O-ring 106. The receptacle 117 of the holder block 114 has a stepped shape corresponding to the shape of the flange portion of the transceiver ferrule 102.

Each face plate 116 defines a ferrule opening through which the pin portion 103 of each transceiver ferrule 102 extends from a respective receptacle 117 in the holder block 114 to protrude from the holder body 112. The face plate 116 compresses the resiliently compressible O-ring 106 against the shoulder of the sleeve 105 to retain the transceiver ferrules 102 in the holder body 112 (see also FIG. 4). Any suitable method of securing the face plate 116 to the holder block 114 may be used without departing from the scope of the disclosure, including, for example, adhesive bonding, welding, mechanical interlocking components, fasteners, etc.

Ferrule holder bodies in the scope of this disclosure can comprise holder-to-holder interfaces. Generally, the holder-to-holder interface of a first holder body is configured to engage the holder-to-holder interface of a second holder body to operatively align the first holder body with the second holder body to position the first grouping of transceiver ferrules and the second grouping of transceiver ferrules in the optical connector interface for making optical connections to one or more optical connectors plugged into the optical connector interface. In certain embodiments, the holder-to-holder interface of a third ferrule holder body is configured to engage the holder-to-holder interface of the second holder body to further operatively align the third holder body with the first and second holder bodies. Still furthermore, the holder-to-holder interface of a fourth ferrule holder body can be configured to engage the holder-to-holder interface of the third holder body to operatively align the fourth holder body with the first, second, and third holder bodies, etc.

Referring to FIG. 3, in the case of the holder body 112, the holder-to-holder interface comprises a first holder-to-holder interface portion 118 along a first side margin of the respective holder body and a second holder-to-holder interface portion 120 along a second side margin of the respective holder body. Broadly, each first holder-to-holder interface portion 118 has a shape, and each second holder-to-holder interface portion 120 has a complementary shape configured fit into the first holder-to-holder interface portion of an adjacent holder body 112. More particularly, each first holder-to-holder interface portion 118 comprises a channel and each second holder-to-holder interface portion 120 comprises a flange configured to be received in the channel.

Referring to FIG. 3, in the illustrated embodiment, each interface channel portion 118 is formed from first and second overhanging retainers 122 spaced apart from one another by a gap 124 at opposite end portions of the holder body 112. Each retainer 122 defines a recess 126 between a main side surface 128 of the body 110 and a parallel section 130 of the overhanging retainer. Each recess 126 has an open end and a closed end spaced apart along a ferrule axis. The closed end of each recess 126 is delimited by a stop face 131 of the overhanging retainer 122.

Each interface flange portion 120 comprises a stem 132 protruding laterally from an opposite main side surface 134 of the holder body 112. Two wings 136 protrude transversely outward from opposite ends of the stem 132. The wings 136 are spaced apart from the main side 134 of the holder body 112 to define respective slots 138.

Figure 7:
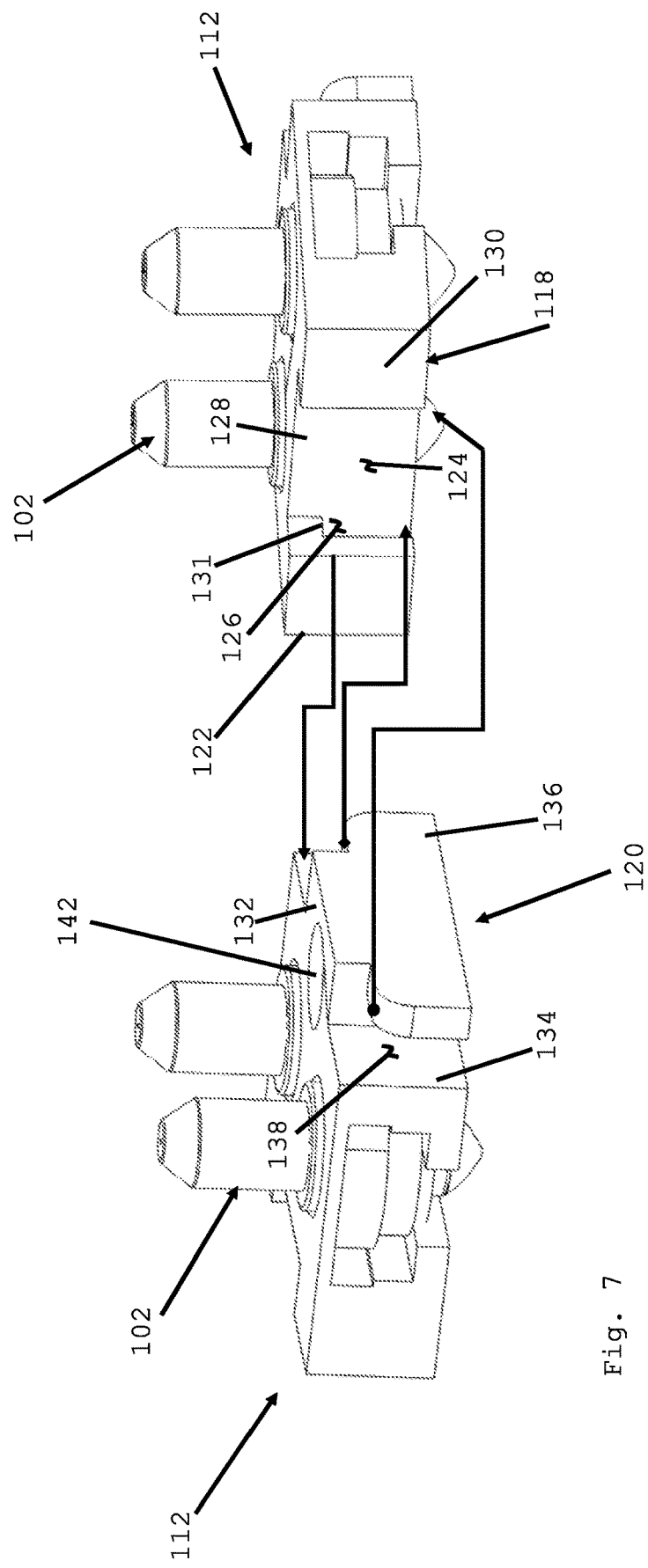
FIG. 7 is an exploded perspective with schematic arrows showing how two two-ferrule holders connect together.
Figure 8:
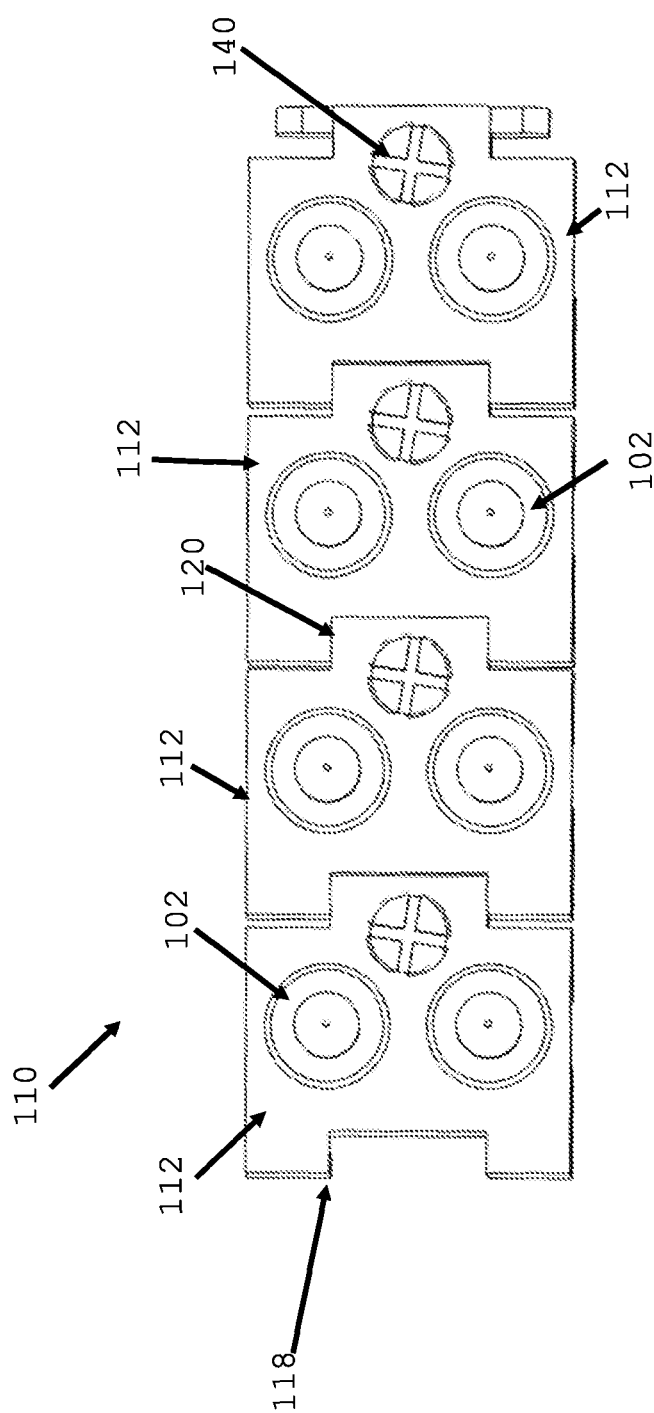
FIG. 8 is a plan view of the grouped ferrule holder assembly.
Figure 9:
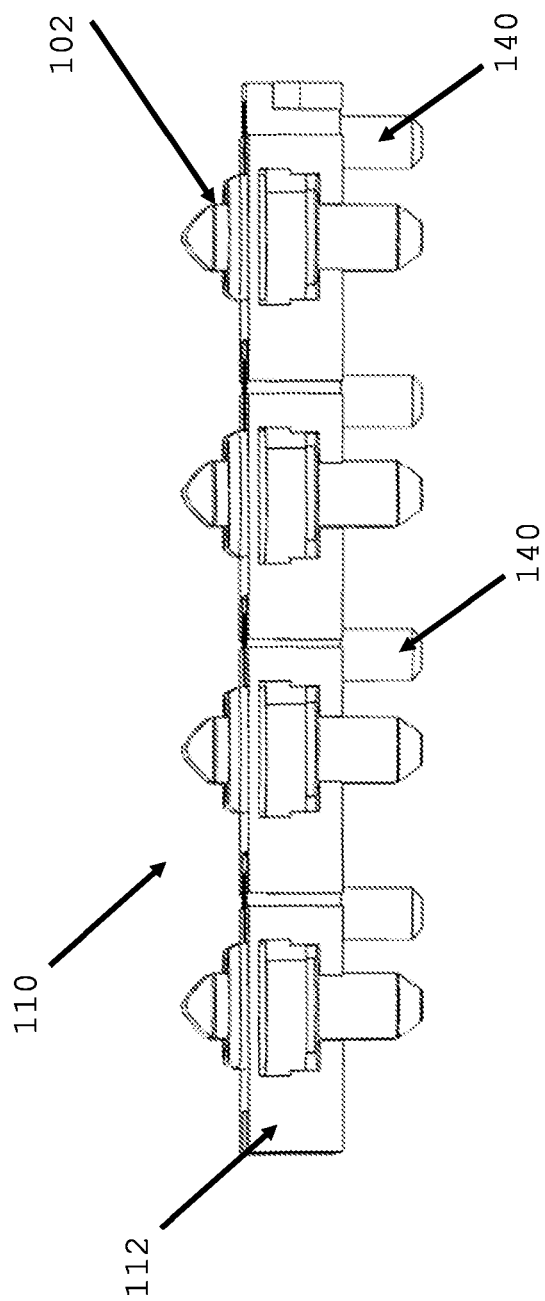
FIG. 9 is an elevation of the grouped ferrule holder assembly.
Figure 10:
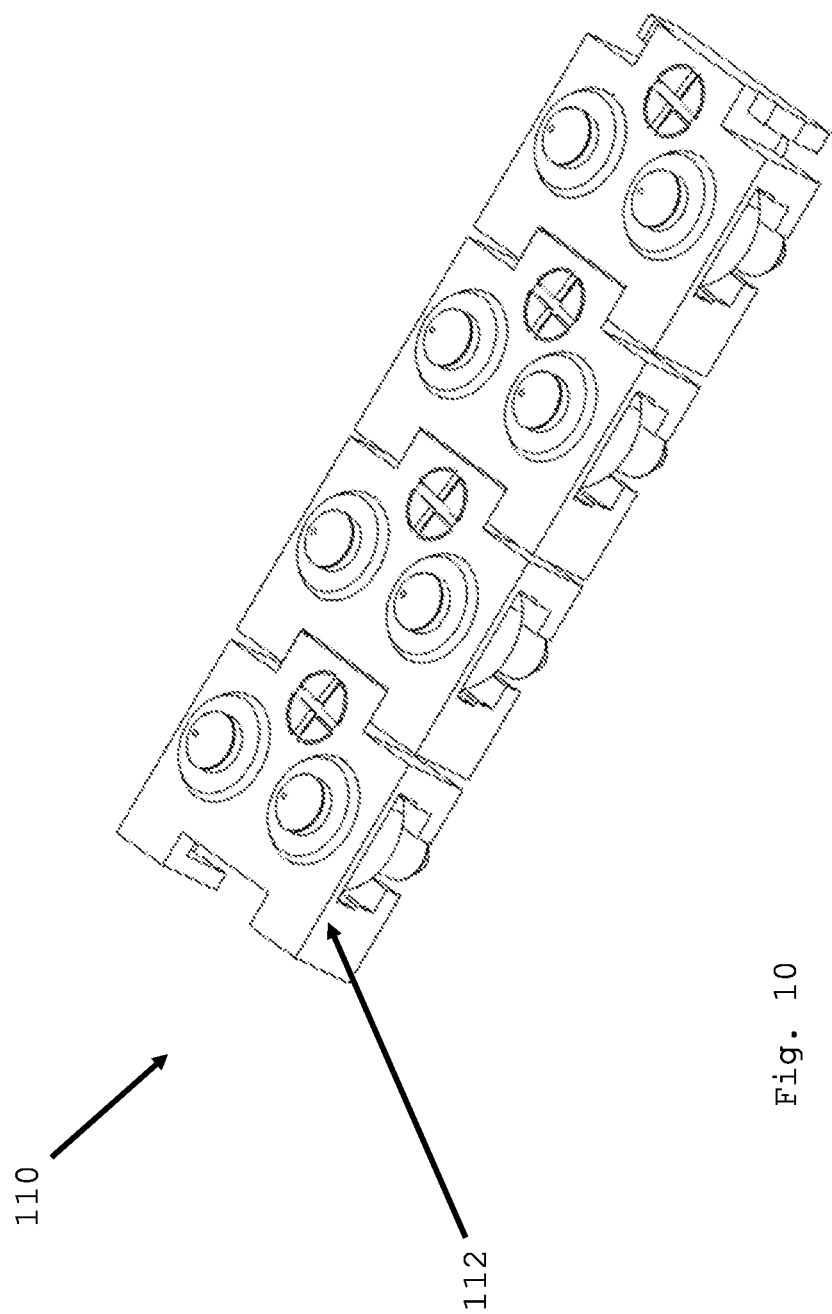
FIG. 10 is a perspective of the grouped ferrule holder assembly.

Referring to FIG. 7, to connect a first ferrule holder body 112 to a second (and so on), the wings 136 of the flange portion 120 of the first ferrule holder body are aligned with the open ends of the recesses 126 of the second holder body and then pushed into the recesses until the wings engage the stop faces 130. This interlocks the first and second holder bodies, connecting them together via the integral holder-to-holder interfaces. Once connected, the stem 132 fits in the gap 124, the wings 136 fit into the recesses 126, and the sections 130 of the retainers 122 fit in the slots 138. Thus it can be seen that the illustrated holder bodies 112 are equipped with integral holder-to-holder interface portions 118, 120 that enable the holder bodies 112 to be connected in side-by-side relation to form the grouped ferrule holder assembly 110 by mechanical interlock of the holder bodies.

In the illustrated embodiment, each holder body 112 comprises a removable fastener 140 (e.g., a screw; see FIG. 8) and/or a corresponding fastener receiving opening 142 in which to receive the fastener (e.g., see FIG. 1). The fasteners 140 in the holder bodies 112 are configured to hold the grouped ferrule holder assembly 110 in an optical interface of a transceiver.

Figure 11:
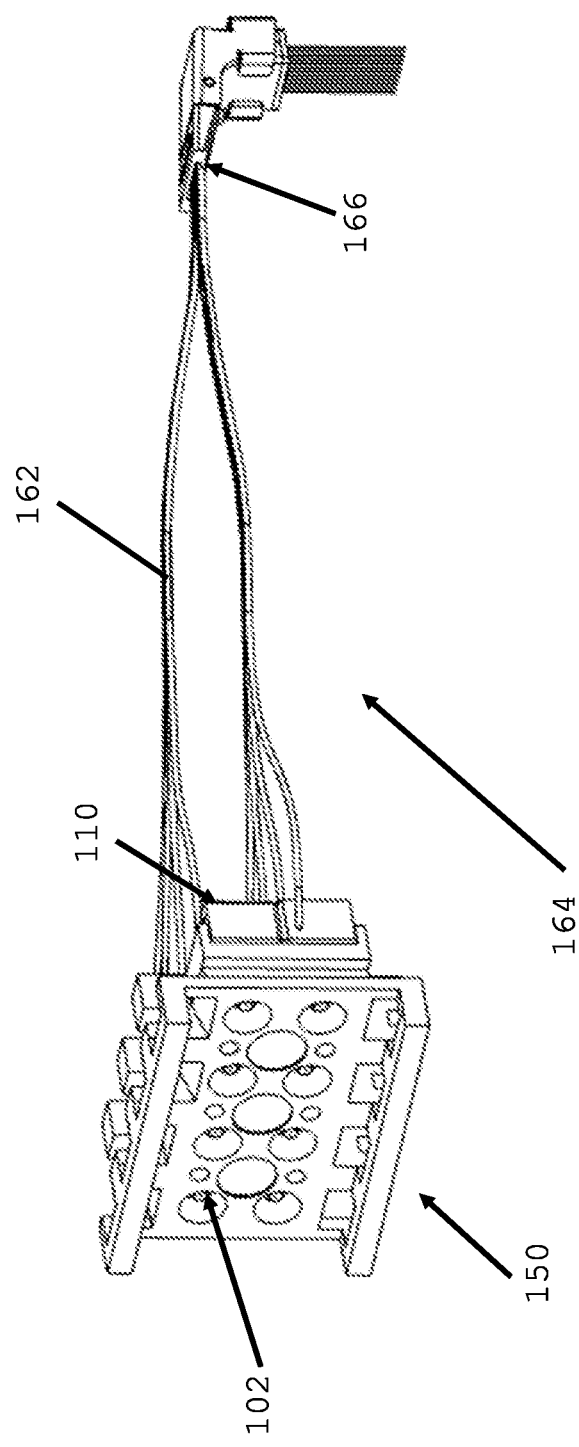
FIG. 11 is a perspective of the grouped ferrule holder assembly secured to a load frame of an optical interface and connected to a fiber array.
Figure 26:
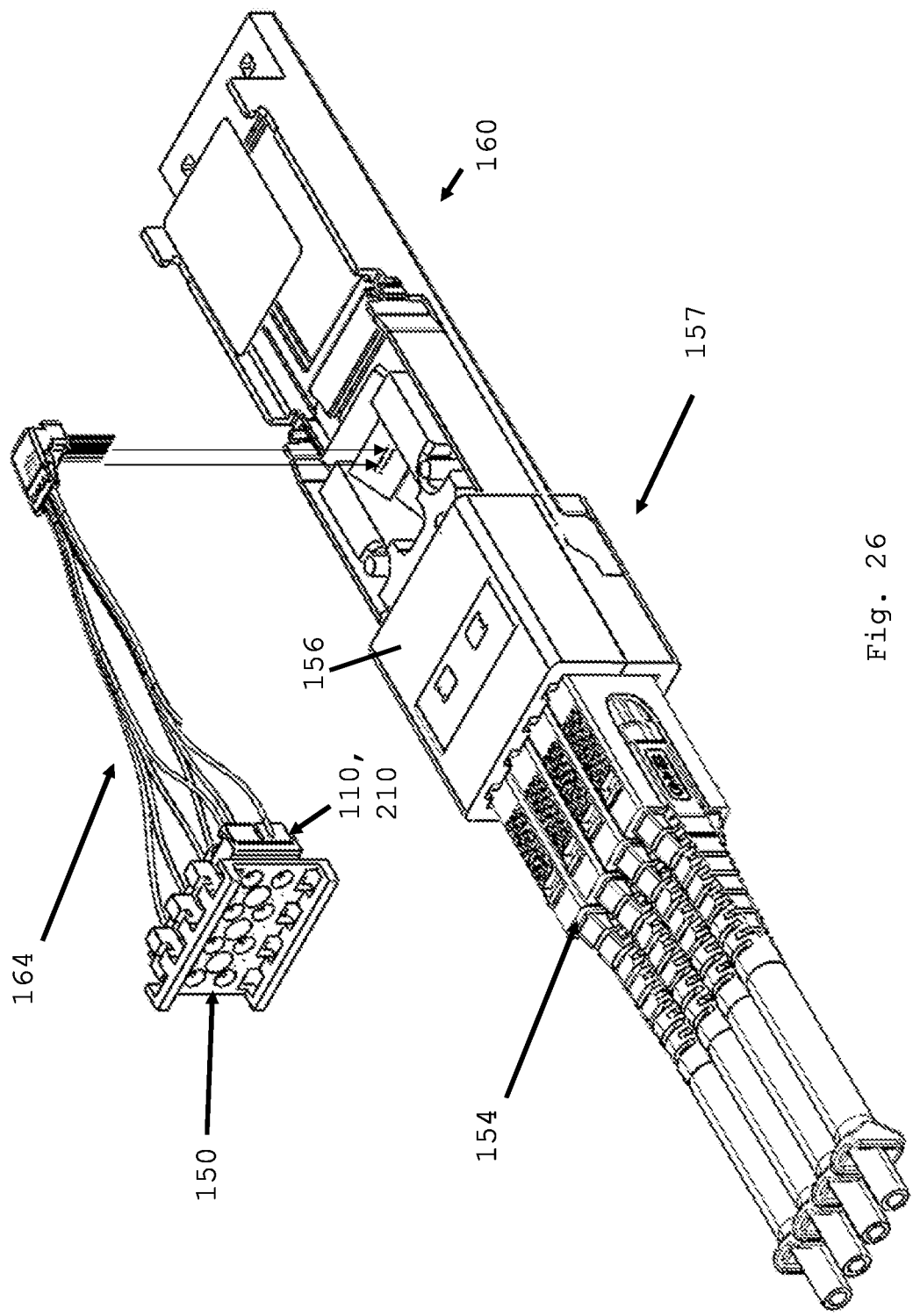
FIG. 26 is an exploded perspective showing how the assembly of FIG. 23 is installed in a transceiver.
Figure 29:
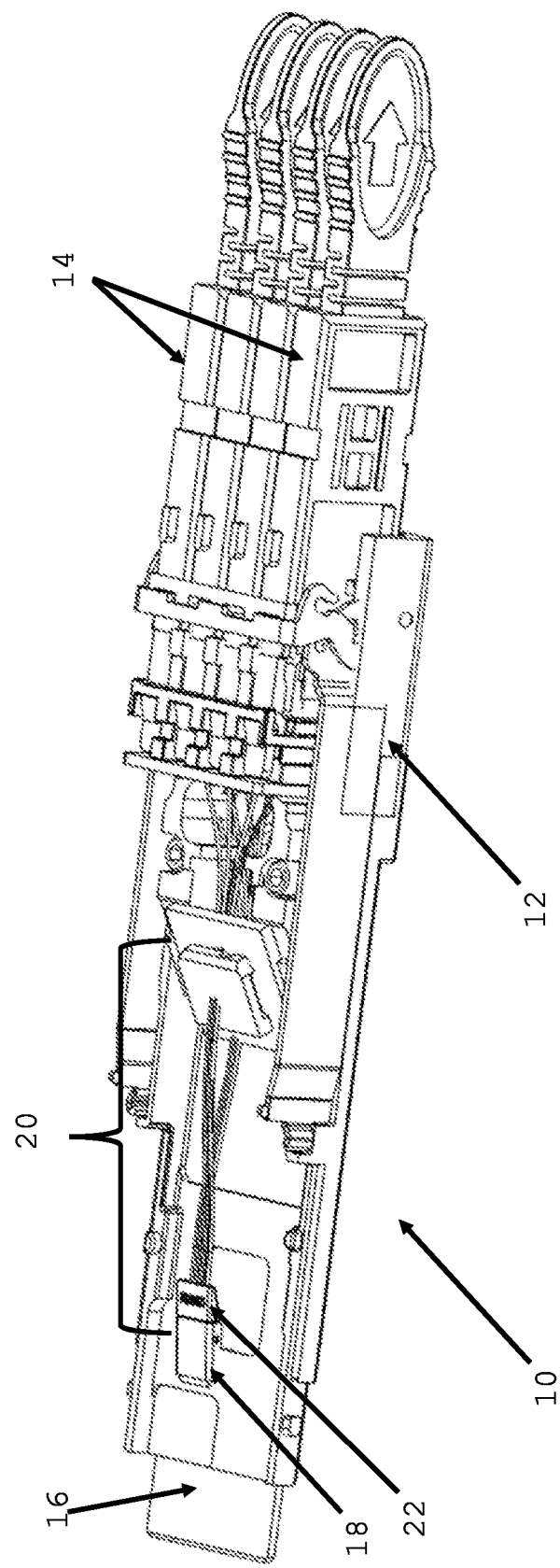
FIG. 29 is another perspective of a transceiver.

Referring to FIG. 11, the fasteners 140 can be used to attach the grouped ferrule holder assembly 110 to the back side of a load frame 150 of an optical interface of a transceiver. In one or more embodiments, the load frame 150 comprises a plate portion that has a plurality of openings corresponding with the ferrules 102 held in the grouped ferrule holder assembly 110. As shown in FIG. 24, the illustrated load frame 150 is configured to couple to a set of adapter hooks 152 (broadly, an adapter structure or adapter latching structure) that is configured to latch with a set of standard SN™ connectors 154 (FIG. 26), e.g., four standard SN™ connectors. As shown in FIG. 26, the larger assembly comprising the ferrule holder assembly 110 and the load frame 150 further couples to the adapter hooks 150 inside an optical adapter housing 156 to form an optical interface 157 at the optical interface end of a transceiver 160. Thus, it can be seen that the ferrule holders 112 can assemble together to form a ferrule holder assembly 110 that holds a plurality of ferrules 102 in an optical interface 157 of a transceiver 160.

Figure 12:
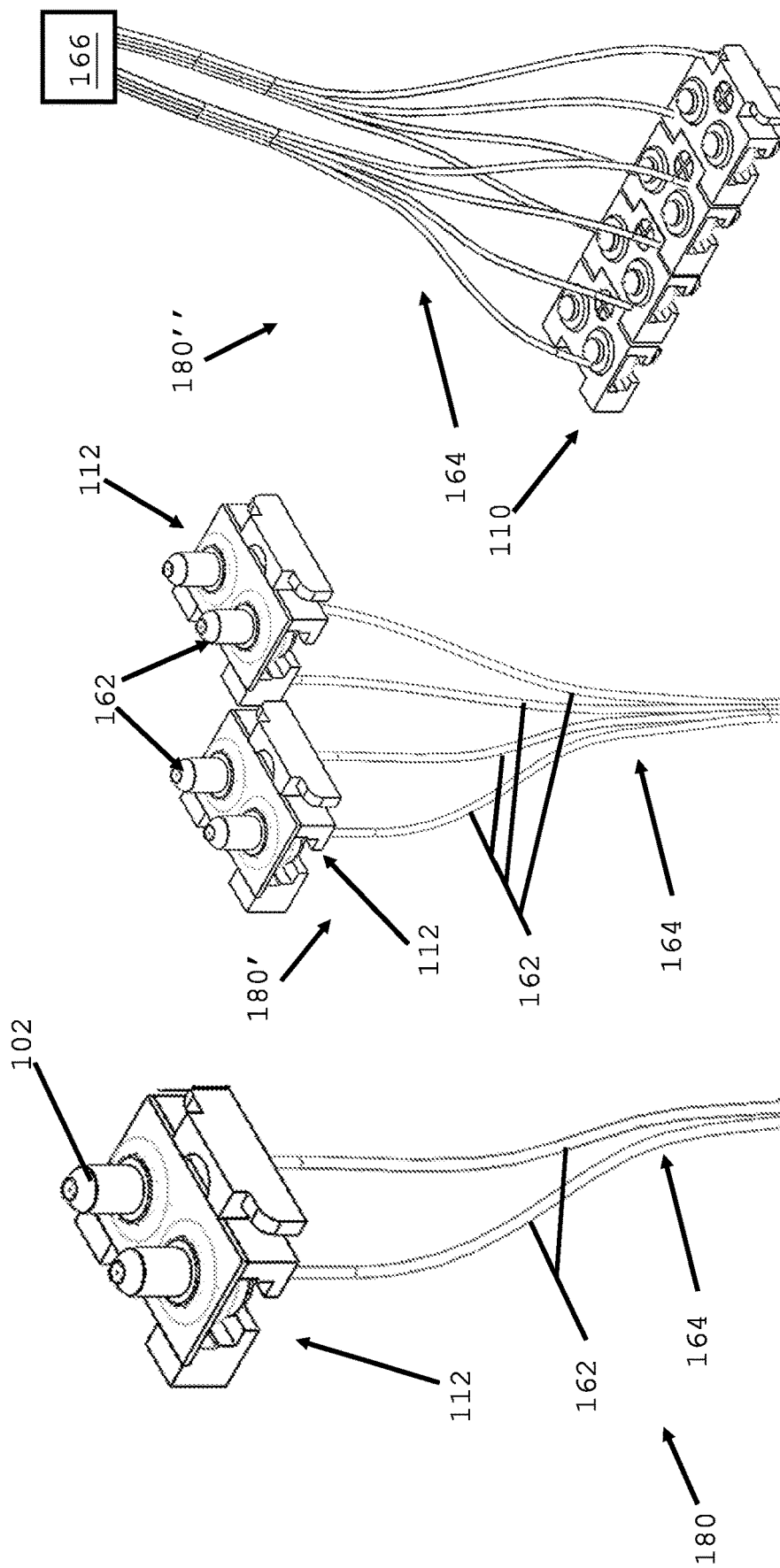
FIG. 12A is a perspective of a pre-terminated fiber array assembly including the two-ferrule holder, a pair of optical fibers, and a multi-fiber optical connector shown schematically.
FIG. 12B is a perspective of a pre-terminated fiber array assembly comprising two two-ferrule holders, four optical fibers, and a multi-fiber optical connector shown schematically.
FIG. 12C is a perspective of a pre-terminated fiber array assembly comprising the grouped ferrule holder assembly, eight optical fibers, and a multi-fiber optical connector shown schematically.
Figure 13:
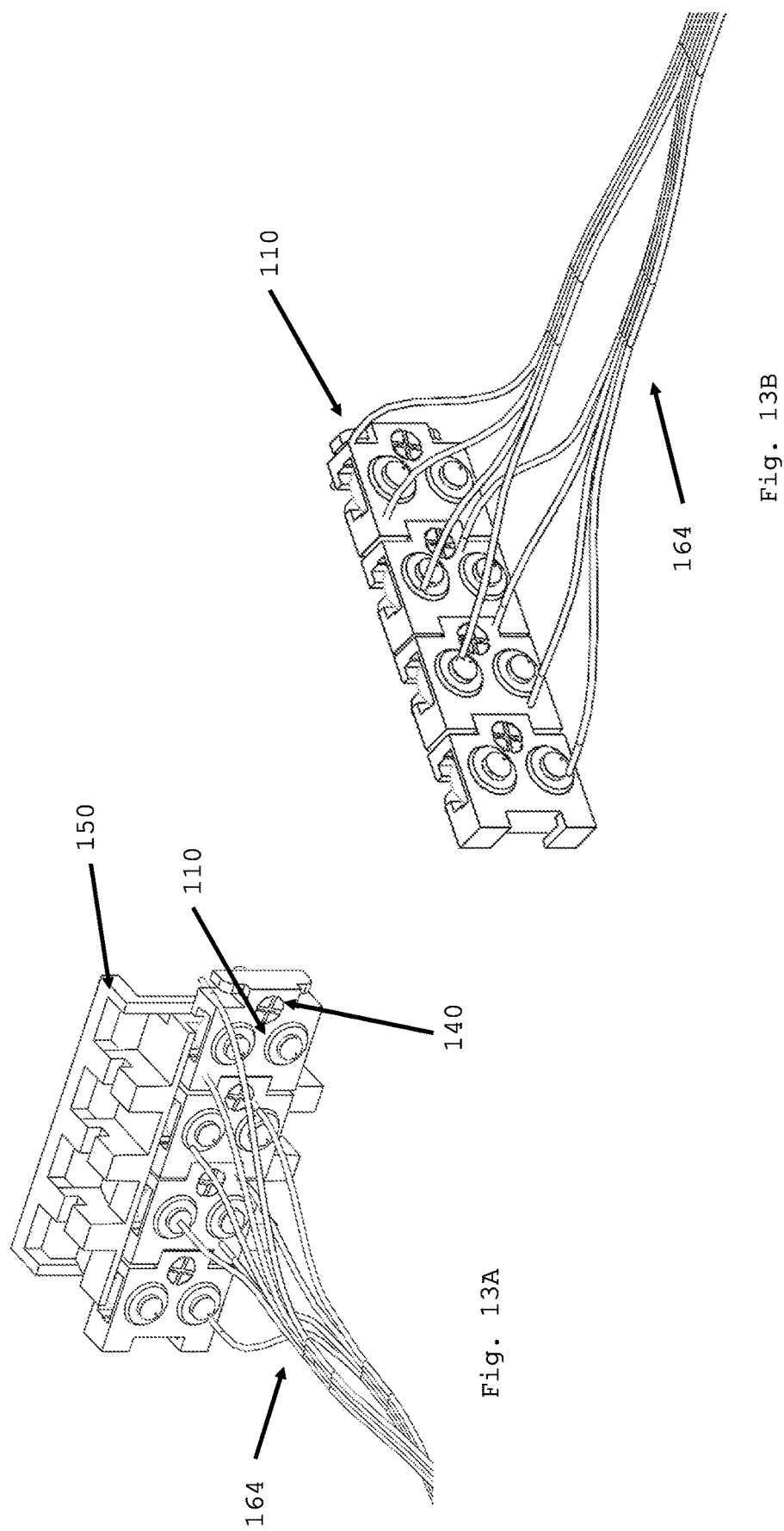
FIG. 13A is a fragmentary perspective of an assembly including the grouped ferrule holder assembly secured to the load frame and fibers terminated by the ferrules of the grouped ferrule holder assembly.
FIG. 13B is a fragmentary perspective of the grouped ferrule holder assembly and fibers terminated by the ferrules of the grouped ferrule holder assembly.
Figure 14:
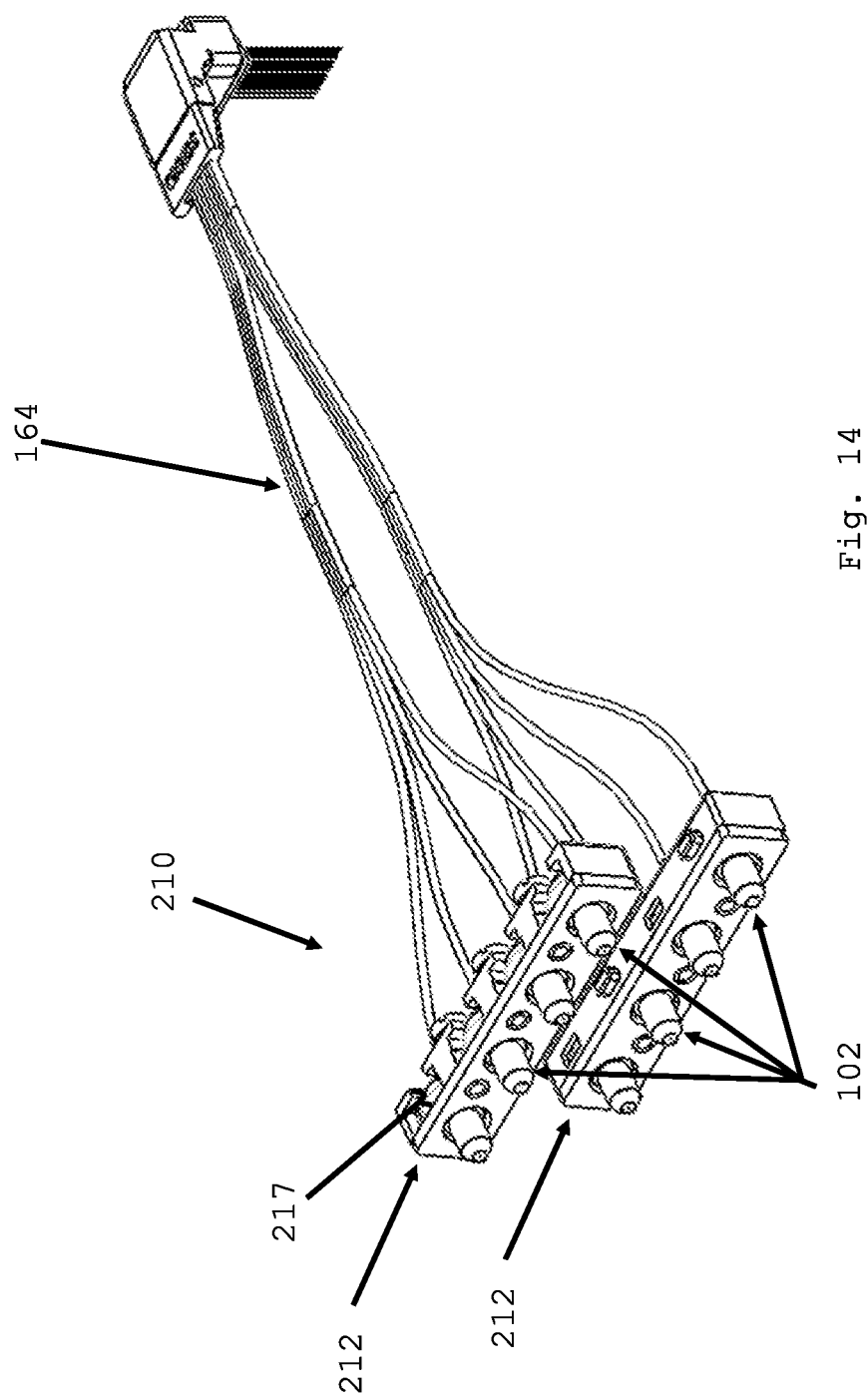
FIG. 14 is a perspective of an assembly including a grouped ferrule holder assembly made up of two four-ferrule holders and array of fibers running between ferrules of the grouped ferrule holder assembly and an opposite connector.
Figure 19F:
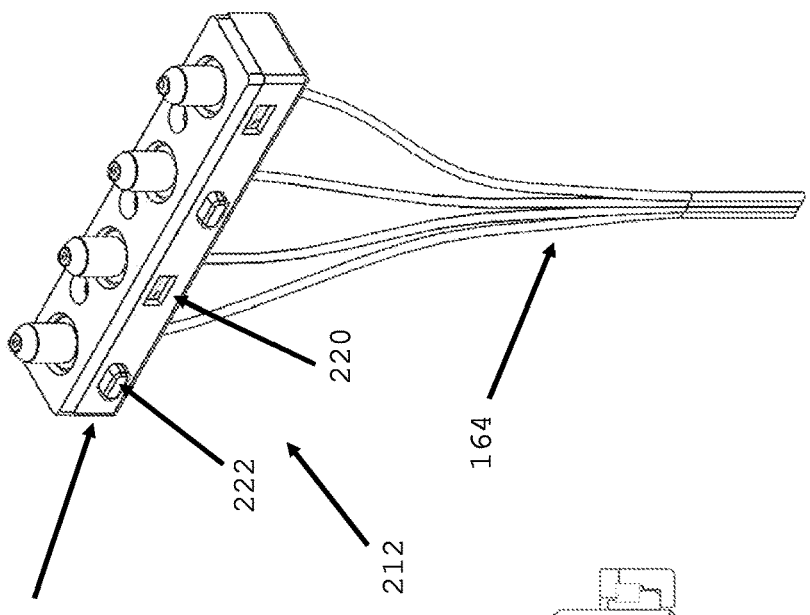
FIG. 19F is a perspective of the four-ferrule holder terminating four fibers.
Figure 19E:
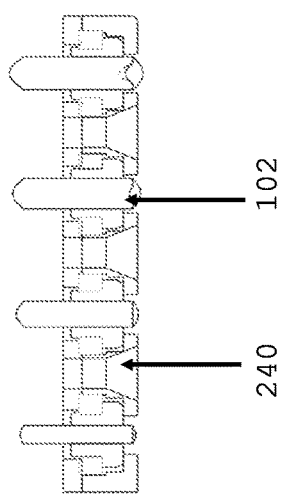
FIG. 19E is a cross-section of the four-ferrule holder fitted with four ferrules of different sizes.
Figure 19D:
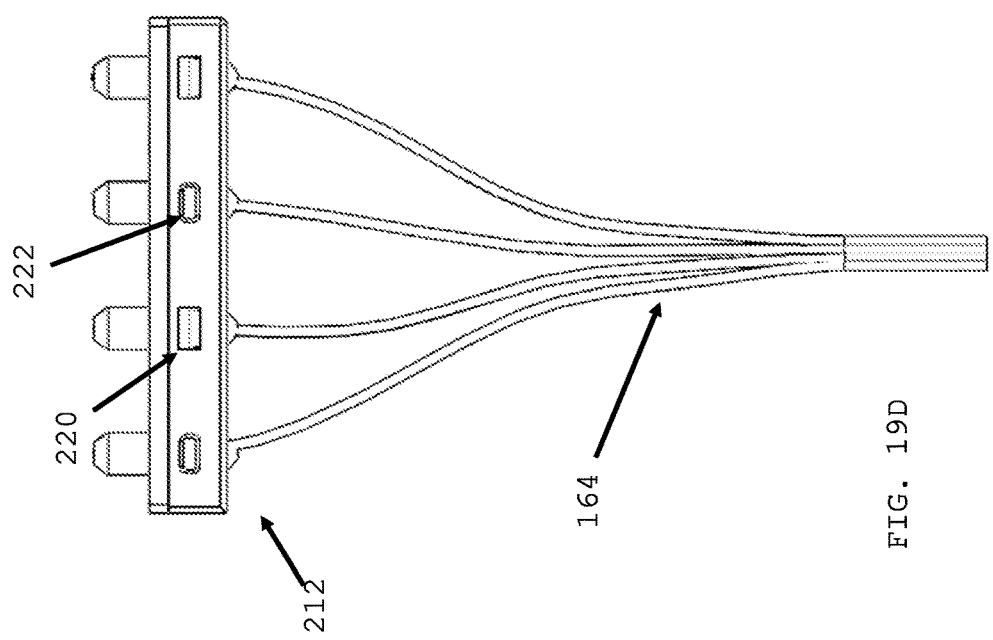
FIG. 19D is a plan view of the four-ferrule holder terminating four fibers.

Referring to FIGS. 12A-12C, the transceiver ferrules 102 in each of the holder bodies 112 is configured to terminate optical fibers 162 of an optical fiber array 164. The opposite ends of the fibers are preferably terminated by multi-fiber connectors 166 configured connect to board-mounted connectors on a circuit board of the transceiver 160. As shown in FIGS. 12A-12C, the grouped ferrule holder assembly 110 can be used with various configurations of optical fiber arrays 160.

Each of FIGS. 12A-12C depict exemplary pre-terminated fiber arrays 180, 180', 180" assembled in accordance with present disclosure. In FIG. 12A, the pre-terminated fiber array assembly 180 comprises a pre-terminated two-fiber assembly including two transceiver ferrules 102, two fibers 162, and a multi-fiber connector 166. Each transceiver ferrule 102 terminates a first end of one of the optical fibers 162 and the multi-fiber connector 166 terminates the opposite second end of the two optical fibers. It can be seen that the holder body 112 holds the two ferrules 102 of the pre-terminated two-fiber array in an operative position for being installed in the optical interface 157 of the transceiver 160. Thus, in an exemplary method of making a transceiver in accordance with the present disclosure, the ferrules 102 of the pre-terminated fiber array 180 are installed in a holder body 112 to form an assembly 180 comprising fibers running between (i) a grouping of ferrules, held at operative positions by the holder, at one end and (ii) a multi-fiber 166 connector configured to be plugged into a transceiver circuit board at the other end. The holder body 112 of the assembly 180 is connected to one or more additional holder bodies (e.g., holder bodies of additional pre-terminated fiber array assemblies 180 or 180') to form the grouped ferrule holder assembly 110. The grouped ferrule holder assembly 110 is then installed in an optical interface 157 of the transceiver 160 and each pre-terminated multi-fiber connector is plugged into a corresponding board-mounted connector on the circuit board. Those skilled in the art will appreciate that the two-fiber connector 166 of each pre-terminated fiber array assembly 180 may, in certain embodiments, be configured to connect to a board-mounted connector in communication with one transmitters (TX) and one receiver (RX).

In FIG. 12B, the pre-terminated fiber array assembly 180' comprises a pre-terminated four-fiber assembly including four transceiver ferrules 102, four fibers 162, and a multi-fiber connector 166. Each transceiver ferrule 102 terminates a first end of one of the optical fibers 162 and the multi-fiber connector 166 terminates the opposite second end of the four optical fibers. It can be seen that two-holder body 112 holds the four ferrules 102 of the pre-terminated two-fiber array in an operative position for being installed in the optical interface 157 of the transceiver 160. The pre-terminated fiber array assembly 180' can be assembled into a grouped ferrule holder assembly 110 that is installed in an optical interface 157 of the transceiver 160, and each pre-terminated multi-fiber connector 166 can be plugged into a corresponding board-mounted connector on the circuit board. Those skilled in the art will appreciate that the four-fiber connector 166 of each pre-terminated fiber array assembly 180' may, in certain embodiments, be configured to connect to a single board-mounted connector in communication with two transmitters (TX) and two receivers (RX).

In FIG. 12C, the pre-terminated fiber array assembly 180" comprises a pre-terminated eight-fiber assembly including eight transceiver ferrules 102, eight fibers 162, and a multi-fiber connector 166. Each transceiver ferrule 102 terminates a first end of one of the optical fibers 162 and the multi-fiber connector 166 terminates the opposite second ends of all eight optical fibers. It can be seen that four holder bodies 112 hold the eight ferrules 102 of the pre-terminated two-fiber array in an operative position for being installed in the optical interface 157 of the transceiver 160. The pre-terminated fiber array assembly 180 can be assembled into a grouped ferrule holder assembly 110 that is installed in an optical interface 157 of the transceiver, and the pre-terminated multi-fiber connector 166 can be plugged into a corresponding board-mounted connector on the circuit board. Those skilled in the art will appreciate that the eight-fiber connector 166 of each pre-terminated fiber array assembly 180" may, in certain embodiments, be configured to connect to a board-mounted connector in communication with four transmitters (TX) and four receivers (RX).

Referring to FIGS. 14-23, a second exemplary embodiment of a grouped ferrule holder assembly configured to support a plurality of transceiver ferrules 102 in an optical connector interface of an optical transceiver is generally indicated at reference number 210. The grouped ferrule holder assembly 210 comprises two holder bodies (e.g., first and second holder bodies) 212 that can be connected together to position the ferrules 102 as required for a given optical connector interface 157 of a transceiver 160. In the drawings, each holder body 212 is configured to hold a respective grouping of four transceiver ferrules 102. More particularly, each body 212 holds first, second, third, and fourth transceiver ferrules 102 at a pitch of 3.9 mm, corresponding to the standard lateral pitch between the ferrules of adjacent SN™ connectors mated to an SN™ adapter. When a first holder body 212 is operatively connected to a second holder body, the first grouping of ferrules 102 in the first holder is spaced apart from the first grouping of ferrules in the second holder at a pitch of about 3.1 mm, corresponding to the standard ferrule pitch of an individual SN™ connector.

In the illustrated embodiment, each holder body 212 comprises a holder body block 214 and a face plate 216 secured to the holder body block. Each holder body block 214 defines four receptacles 217 for receiving a flange portion of each transceiver ferrule 102 in the grouping of ferrules held by the holder body 212. Each receptacle has a stepped shape corresponding to the shape of the flange portion of the transceiver ferrule 102. Each face plate 216 defines a ferrule opening through which the pin portion 103 of each transceiver ferrule 102 extends from a respective receptacle 217 to protrude from the holder body 212. The face plate 216 compresses the resiliently compressible O-ring 106 against the shoulder of the sleeve 105 to retain the transceiver ferrules 102 in the holder body 212 (see also FIG. 4). Any suitable method of securing the face plate 216 to the holder block 214 may be used without departing from the scope of the disclosure, including, for example, adhesive bonding, welding, mechanical interlocking components, fasteners, etc.

The holder body 212 comprises a holder-to-holder interface 218 along one end of the holder body. In the illustrated embodiment, the holder-to-holder interface 218 comprises at least one mortice 220 (broadly, receiver) and at least one tenon 222 (broadly, post) configured to connect to the mortice by friction fit. More particularly, each holder-to-holder interface 218 comprises two mortices 220 and two tenons 22 that alternate along the length of the end of the holder body 212. The holder bodies 212 are identical so that when a first holder body is in a first orientation and a second holder body is a second inverted orientation as shown in FIGS. 16 and 18, the mortices 220 of the first holder body align with the tenons 222 of the second holder body, allowing the first and second holder bodies to be press-fit together.

In the illustrated embodiment, each holder body 212 comprises a plurality of removable fasteners 240 (e.g., a screw) and/or a corresponding fastener receiving openings 242 in which to receive/engage the fastener. The fasteners 240 in the holder bodies 212 are configured to secure the holders of the grouped ferrule holder assembly 210 in an optical interface 257 of a transceiver 260.

Figure 22:
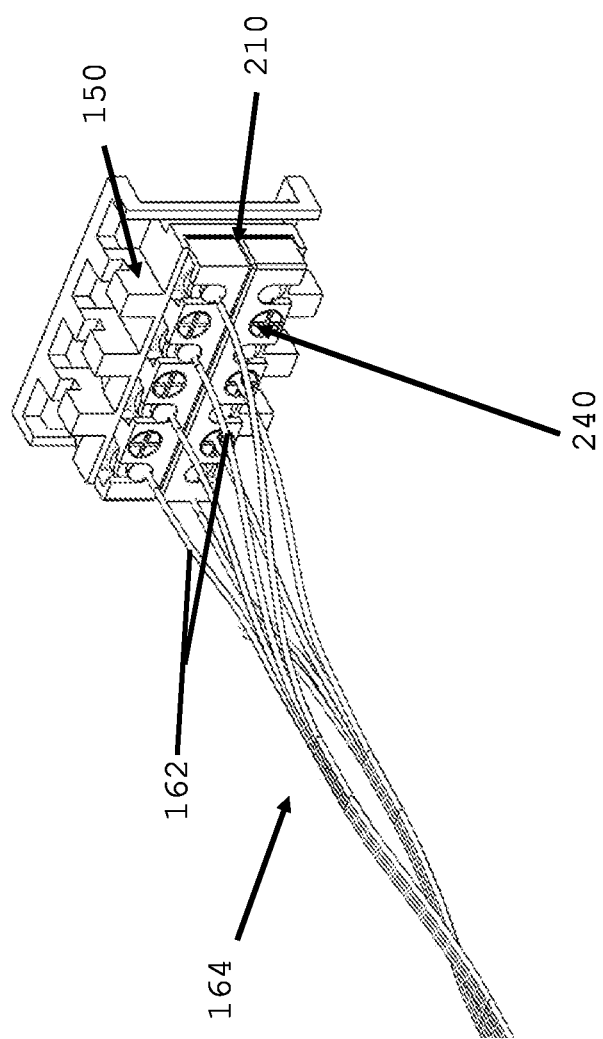
FIG. 22 is another perspective of the assembly of FIG. 21.
Figure 23:
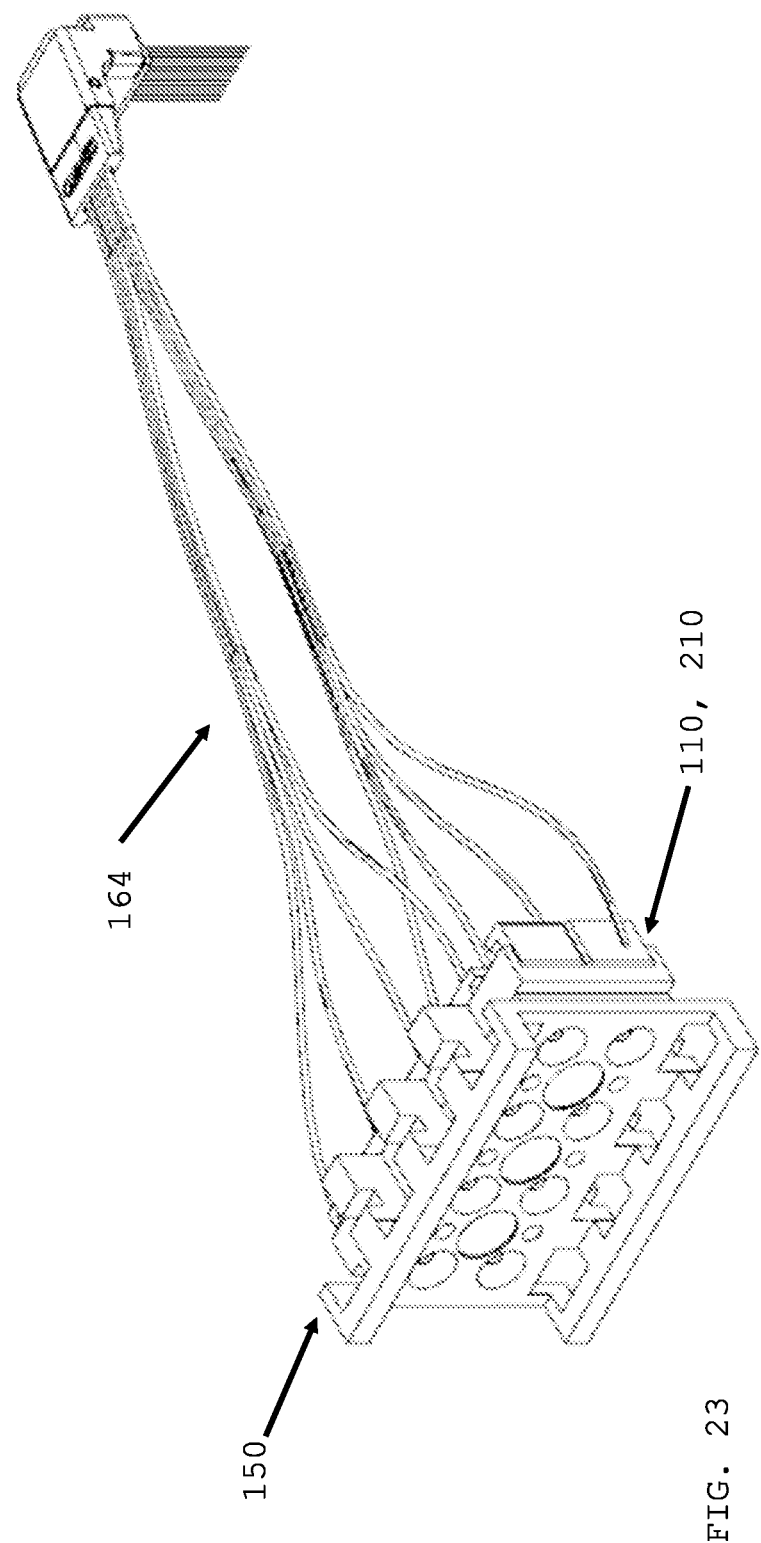
FIG. 23 is another perspective of a grouped ferrule holder assembly terminating a fiber array and secured to a load frame.

Referring to FIGS. 22-24, the fasteners 240 can be used to attach the grouped ferrule holder assembly 210 to the back side of a load frame 150 in the same way as the holder assembly 110. Thus, it can be seen that the ferrule holders 212 can assemble together to form a ferrule holder assembly 210 that, in combination with the load frame 150, latch adapter hooks 152, and optical adapter housing 156, holds a plurality of ferrules 102 in an optical interface 157 of a transceiver 160 for making optical connections to connectors 254 plugged into the optical interface.

Figure 21:
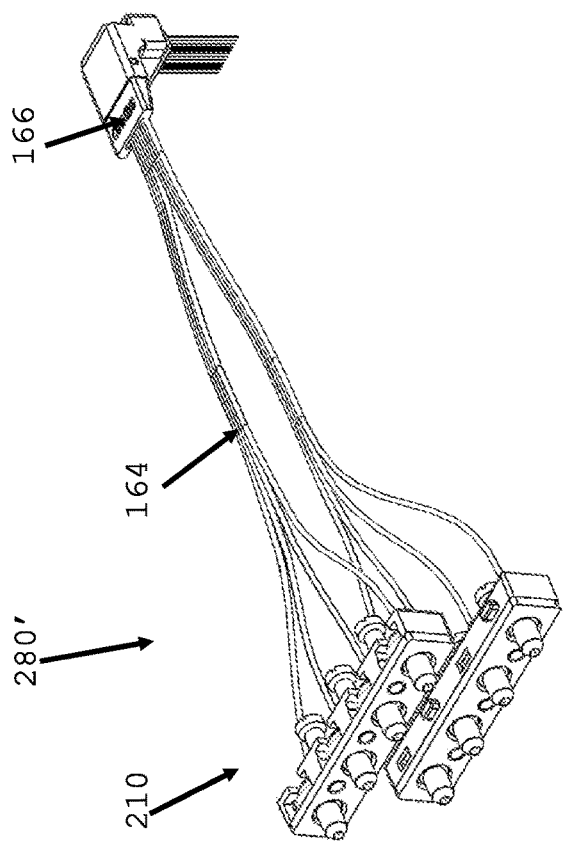
FIG. 21 is a perspective similar to FIG. 14.
Figure 20:
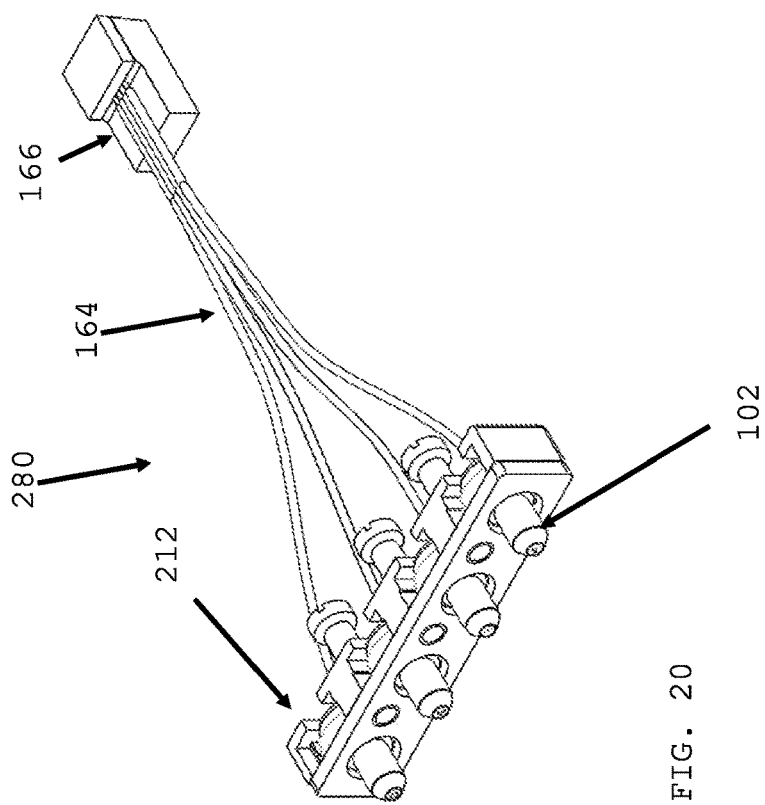
FIG. 20 is a perspective of an assembly including the assembly of FIG. 15 wherein the ferrules are held by the four-ferrule holder.

Referring to FIGS. 20 and 21, like the grouped ferrule holder assembly 110 discussed above, the grouped ferrule holder assembly can be used in combination with exterminated optical fiber arrays to form pre-terminated fiber array assemblies 280, 280' that can install in a transceiver 160 with relative ease. In FIG. 20, the pre-terminated fiber array assembly 280 comprises a pre-terminated four-fiber assembly including four transceiver ferrules 102, four fibers 162, and a multi-fiber connector 166. Each transceiver ferrule 102 terminates a first end of one of the optical fibers 162 and the multi-fiber connector 166 terminates the opposite second end of the four optical fibers. It can be seen that the holder body 212 holds the four ferrules 102 of the pre-terminated four-fiber array in an operative position for being installed in the optical interface 157 of the transceiver 160. Thus, in an exemplary method of making a transceiver in accordance with the present disclosure, the ferrules 102 of the pre-terminated fiber array 280 are installed in a holder body 212 to form an assembly 280 comprising fibers running between (i) a grouping of ferrules, held at operative positions by the holder, at one end and (ii) a multi-fiber connector 166 configured to be plugged into a transceiver circuit board at the other end. The holder body 212 of the assembly 280 is connected to one or more additional holder bodies (e.g., holder body of an additional pre-terminated fiber array assembly 280) to form the grouped ferrule holder assembly 210. The grouped ferrule holder assembly 210 is then installed in an optical interface 157 of the transceiver 160 and each pre-terminated multi-fiber connector is plugged into a corresponding board-mounted connector on the circuit board. Those skilled in the art will appreciate that the four-fiber connector 166 of each pre-terminated fiber array assembly 280 may, in certain embodiments, be configured to connect to a board-mounted connector in communication with four transmitters (TX) or four receivers (RX).

In FIG. 21, the pre-terminated fiber array assembly 280' comprises a pre-terminated eight-fiber assembly including eight transceiver ferrules 102, eight fibers 162, and a multi-fiber connector 166. Each transceiver ferrule 102 terminates a first end of one of the optical fibers 162 and the multi-fiber connector 166 terminates the opposite second ends of all eight optical fibers. It can be seen that two holder bodies 212 (one grouped ferrule holder assembly 210) hold the eight ferrules 102 of the pre-terminated two-fiber array in an operative position for being installed in the optical interface 157 of the transceiver 160. The pre-terminated fiber array assembly 280' can be installed in an optical interface 157 of the transceiver, and the pre-terminated multi-fiber connector 166 can be plugged into a corresponding board-mounted connector on the circuit board. Those skilled in the art will appreciate that the eight-fiber connector 166 of each pre-terminated fiber array assembly 180" may, in certain embodiments, be configured to connect to a board-mounted connector in communication with four transmitters (TX) and four receivers (RX).

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A ferrule holder assembly for an optical connector interface of an optical transceiver, the optical connector interface comprising an adapter housing and configured so that one or more optical connectors can be plugged into the adapter housing, the ferrule holder comprising:
   a first holder body configured to hold a first grouping of transceiver ferrules, the first holder body comprising a holder-to-holder interface; and
   a second holder body configured to hold a second grouping of transceiver ferrules, the second holder body comprising a holder-to-holder interface;
   wherein the holder-to-holder interface of the first holder body is configured to engage the holder-to-holder interface of the second holder body to operatively align the first holder body with the second holder body to position the first grouping of transceiver ferrules and the second grouping of transceiver ferrules in relation to the optical connector interface for making optical connections to the one or more optical connectors plugged into the adapter housing,
   wherein the ferrule holder assembly is configured to support a plurality of transceiver ferrules in the optical transceiver between the optical connector interface and a circuit board of the optical transceiver so that the plurality of transceiver ferrules are inboard of a perimeter footprint of the adapter housing and can make optical connections to the one or more optical connectors plugged into the adapter housing.

2. The ferrule holder assembly as set forth in claim 1, wherein the first holder body and the second holder body are configured to hold an equal number of transceiver ferrules.

3. The ferrule holder assembly as set forth in claim 1, wherein the first holder body and the second holder body are each configured to hold two transceiver ferrules.

4. The ferrule holder assembly as set forth in claim 3, wherein the first holder body is configured to hold the first grouping of transceiver ferrules in the optical connector interface to make a connection to first and second connector ferrules of a first optical connector plugged into the optical connector interface and the second holder body is configured to hold the second grouping of transceiver ferrules in the optical connector interface to make a connection to first and second connector ferrules of a second optical connector plugged into the optical connector interface.

5. The ferrule holder assembly as set forth in claim 4, wherein when the holder-to-holder interface of the first holder body operatively engages the holder-to-holder interface of the second holder body to operatively align the first holder body with the second holder body, the first grouping of ferrules are spaced apart from the second grouping of ferrules at a pitch of about 3.9 mm.

6. The ferrule holder assembly as set forth in claim 3, wherein the first ferrule holder is configured to hold the first grouping of ferrules at a pitch of about 3.1 mm and the second ferrule holder is configured to hold the second grouping of ferrules at a pitch of about 3.1 mm.

7. The ferrule holder assembly as set forth in claim 1, further comprising a third holder body configured to hold a third grouping of ferrules and comprising a holder-to-holder interface configured to engage the holder-to-holder interface of the second holder body to operatively align the third holder body with the first and second holder bodies.

8. The ferrule holder assembly as set forth in claim 7, further comprising a fourth holder body configured to hold a fourth grouping of fourth ferrules and comprising a holder-to-holder interface configured to engage the holder-to-holder interface of the third holder body to operatively align the fourth holder body with the first, second, and third holder bodies.

9. The ferrule holder assembly as set forth in claim 7, wherein the holder-to-holder interface of each of the first holder body, the second holder body, and the third holder body, comprises a first holder-to-holder interface portion along a first side margin of the respective holder body and a second holder-to-holder interface portion along a second side margin of the respective holder body.

10. The ferrule holder assembly as set forth in claim 9, wherein each first holder-to-holder interface portion has a shape, and each second holder-to-holder interface portion has a complementary shape configured fit into the first holder-to-holder interface portion of another holder body.

11. The ferrule holder assembly as set forth in claim 9, wherein each first holder-to-holder interface portion comprises a channel and each second holder-to-holder interface portion comprises a flange configured to be received in the channel.

12. The ferrule holder assembly as set forth in claim 1, wherein the first holder body and the second holder body are each configured to hold four transceiver ferrules.

13. The ferrule holder assembly as set forth in claim 12, wherein the first ferrule holder is configured to hold the first grouping of ferrules at a pitch of about 3.9 mm and the second ferrule holder is configured to hold the second grouping of ferrules at a pitch of about 3.9 mm.

14. The ferrule holder assembly as set forth in claim 13, wherein when the holder-to-holder interface of the first holder body operatively engages the holder-to-holder interface of the second holder body to operatively align the first holder body with the second holder body, the first grouping of ferrules are spaced apart from the second grouping of ferrules at a pitch of about 3.1 mm.

15. The ferrule holder assembly as set forth in claim 1, wherein each of the first holder body and the second holder body comprises a holder body block and a face plate secured to the holder body block.

16. The ferrule holder assembly as set forth in claim 15, wherein each holder body block defines a receptacle for receiving a flange portion of each transceiver ferrule of the respective one of the first and second sets of transceiver ferrules.

17. The ferrule holder assembly as set forth in claim 16, wherein each face plate defines a ferrule opening through which a pin portion of each of a transceiver ferrule extends from a respective one of the receptacles to protrude from the respective one of the first and second holder bodies.

18. A transceiver comprising an optical interface including the ferrule holder assembly of claim 1.

19. The transceiver as set forth in claim 18, further comprising a load frame, the ferrule holder assembly being fastened to the load frame.

20. The ferrule holder assembly as set forth in claim 1, wherein each holder body is configured to engage a fastener for fastening the ferrule holder assembly to the optical connector interface.

21. A method of making a transceiver comprising:
assembling the ferrule holder assembly of claim 1;
securing the ferrule holder assembly in an optical connector interface of a transceiver; and
connecting optical fibers between a plurality of ferrules held by the ferrule holder assembly and one or more board-mounted connectors on a circuit board of the transceiver.

22. The ferrule holder assembly as set forth in claim 1, wherein each first holder body is generally rectangular with four side portions, at least two of the four side portions of each holder body being devoid of any portion of the holder-to-holder interface.

23. The ferrule holder assembly as set forth in claim 1, wherein each holder body has a front end defining a front-most point of the holder body and wherein each holder body is configured hold the respective grouping of transceiver ferrules so that each transceiver ferrule protrudes forward from the front end.

24. A ferrule holder assembly comprising:
a first holder body configured to hold a first grouping of transceiver ferrules, the first holder body comprising a holder-to-holder interface; and
a second holder body configured to hold a second grouping of transceiver ferrules, the second holder body comprising a holder-to-holder interface;
wherein the holder-to-holder interface of the first holder body is configured to engage the holder-to-holder interface of the second holder body to operatively align the first holder body with the second holder body to position the first grouping of transceiver ferrules and the second grouping of transceiver ferrules in the optical connector interface for making optical connections to one or more optical connectors plugged into an optical connector interface,
wherein the ferrule holder assembly is configured to support a plurality of transceiver ferrules in an optical transceiver;
wherein each holder-to-holder interface comprises at least one mortice portion and at least one tenon portion, the at least one mortice portion of the holder-to-holder interface of the first holder body configured to receive the at least one tenon portion of the holder-to-holder interface of the second holder body and the at least one mortice portion of the holder-to-holder interface of the second holder body configured to receive the at least one tenon portion of the holder-to-holder interface of the first holder body.

25. A ferrule holder assembly comprising:
a first holder body configured to hold a first grouping of transceiver ferrules, the first holder body comprising a holder-to-holder interface; and
a second holder body configured to hold a second grouping of transceiver ferrules, the second holder body comprising a holder-to-holder interface;
wherein the holder-to-holder interface of the first holder body is configured to engage the holder-to-holder interface of the second holder body to operatively align the first holder body with the second holder body to position the first grouping of transceiver ferrules and the second grouping of transceiver ferrules in the optical connector interface for making optical connections to one or more optical connectors plugged into an optical connector interface,
wherein the ferrule holder assembly is configured to support a plurality of transceiver ferrules in an optical transceiver;
wherein each of the first holder body and the second holder body comprises a holder body block and a face plate secured to the holder body block;
wherein each holder body block defines a receptacle for receiving a flange portion of each transceiver ferrule of the respective one of the first and second sets of transceiver ferrules;
wherein each face plate defines a ferrule opening through which a pin portion of each of a transceiver ferrule extends from a respective one of the receptacles to protrude from the respective one of the first and second holder bodies;
wherein the ferrule holder assembly further comprises a resiliently compressible ring disposed around the pin portion of each transceiver ferrule between the face plate and the flange portion of the ferrule.

26. A transceiver comprising an optical connector interface including a ferrule holder assembly and a load frame, the ferrule holder assembly being fastened to the load frame, the ferrule holder assembly comprising:
  wherein the ferrule holder assembly further comprise:
    a first holder body configured to hold a first grouping of transceiver ferrules, the first holder body comprising a holder-to-holder interface; and
    a second holder body configured to hold a second grouping of transceiver ferrules, the second holder body comprising a holder-to-holder interface;
    wherein the holder-to-holder interface of the first holder body is configured to engage the holder-to-holder interface of the second holder body to operatively align the first holder body with the second holder body to position the first grouping of transceiver ferrules and the second grouping of transceiver ferrules in the optical connector interface for making optical connections to one or more optical connectors plugged into an optical connector interface,
    wherein the ferrule holder assembly is configured to support a plurality of transceiver ferrules in the transceiver;
  wherein the optical interface further comprises an adapter housing having a perimeter footprint, the ferrule holder assembly operatively positioning at least four transceiver ferrules within the adapter housing so that the plurality of transceiver ferrules are inboard of the perimeter footprint of the adapter housing and can make optical connections to the one or more optical connectors plugged into the adapter housing.

\* \* \* \* \*